United States Patent
Anju et al.

(10) Patent No.: US 8,228,777 B2
(45) Date of Patent: Jul. 24, 2012

(54) OBJECTIVE LENS, AN OPTICAL PICKUP, AND OPTICAL INFORMATION RECORDING/REPRODUCING APPARATUS

(75) Inventors: Kouhei Anju, Tokyo (JP); Motoo Aiba, Tokyo (JP)

(73) Assignee: Sony Corporation, Tokyo (JP)

( * ) Notice: Subject to any disclaimer, the term of this patent is extended or adjusted under 35 U.S.C. 154(b) by 81 days.

(21) Appl. No.: 12/880,242

(22) Filed: Sep. 13, 2010

(65) Prior Publication Data
US 2011/0069598 A1    Mar. 24, 2011

(30) Foreign Application Priority Data
Sep. 18, 2009   (JP) ................................. 2009-217552

(51) Int. Cl.
*G11B 7/135*   (2012.01)
(52) U.S. Cl. .................. 369/112.23; 359/642
(58) Field of Classification Search ............. 369/112.23; 359/642
See application file for complete search history.

(56) References Cited

U.S. PATENT DOCUMENTS
2008/0259775 A1 * 10/2008 Yamagata et al. ....... 369/112.23

FOREIGN PATENT DOCUMENTS
JP    4130938    6/2008

* cited by examiner

*Primary Examiner* — Wayne Young
*Assistant Examiner* — Brenda Bernardi
(74) *Attorney, Agent, or Firm* — Wolf, Greenfield & Sacks, P.C.

(57) ABSTRACT

An objective lens has a numerical aperture of 0.8 or more and focusing a light beam of a wavelength λ of at least 450 nm or less on an optical information recording medium. In this objective lens, a wavefront-aberration deterioration level TOR, accumulative value of aberration deterioration, satisfies the equation (1):

$$TOR = \sqrt{2.5^2(DCm3^2+DCm5^2)+(TSA3^2+TSA5^2)} \leq 0.07[\lambda rms] \quad (1)$$

In the equation (1), TSA3 [λrms/μm] and TSA5 [λrms/μm] refer to a third-order thickness sensitivity level and a fifth-order thickness sensitivity level, which are generated when a thickness error from a predetermined thickness is +1 μm, respectively. DCm3 and DCm5 refer to a third-order decentering sensitivity level and a fifth-order decentering sensitivity level, which are generated when a decentering error of each of lens surfaces is 1 μm, respectively.

10 Claims, 22 Drawing Sheets

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

LONGITUDINAL ABERRATION DIAGRAM (NA0.85)

OBJECTIVE LENS, AN OPTICAL PICKUP, AND OPTICAL INFORMATION RECORDING/REPRODUCING APPARATUS

BACKGROUND OF THE INVENTION

1. Field of the Invention

The present invention relates an objective lens, an optical pickup, an optical information recording/reproducing apparatus, such as those preferably applied to an optical disc device in which information is recorded on an optical disc as an information recording medium and the information is reproduced from the optical disc.

2. Description of the Related Art

Optical disc devices have been widely used in the art. Any of these devices is designed to record information on an optical disc, such as a compact disc (CD) or a digital versatile disc (DV), and read out the information therefrom. In recent years, Blu-ray Disc (registered trademark, hereinafter also referred to as "BD"), an optical disc with a significant increase in information recording density, is becoming common in addition to these optical discs.

The optical disc device uses an objective lens to focus a light beam on a track spirally or concentrically formed on the recording layer of an optical disc and follow the focal point of the light beam.

For example, in order to accommodate the DVD system, an objective lens is designed to have a numeric aperture (NA) of about 0.6 or more to concentrate a light beam of about 660 nm in wavelength on a recording layer under a cover layer of about 0.6 mm in thickness in an optical disc. In contrast, a very small spot of the light beam is made on the information recording surface of an optical disc in order to accommodate the BD system. Thus, it is desirable to provide an objective lens having a numeric aperture (NA) of about 0.8 or more to concentrate a light beam of about 405 nm in wavelength on the recording layer of the optical disc. Such a recording layer is formed under a cover layer of about 0.1 mm in thickness in the optical disc.

The single object lens that satisfies the functions of an objective optical system a numeric aperture (NA) of 0.8 or more is almost 10 times sensitive to a production tolerance than any of other objective lenses commonly used for CDs and DVDs because the NA of the former is larger than that of the latter.

Therefore, even if such a kind of the objective lens has a production tolerance in a micrometer order, it may lead to a decrease in production yield because of being provided as a defective product that does not satisfy the desired optical characteristics of the optical lens.

Here, the single objective lens is formed, for example, by filling a so-called glass material, such as a material made of glass or resin, into a pair of dies in a certain manufacturing device.

At this time, in the manufacturing device, a positional displacement between dies or molding members that form the opposite sides of an objective lens may occur due to a problem in accuracy or the like. The degree of the positional displacement corresponds to a level defined as production tolerance of the objective lenses. Mainly, there are two kinds of production tolerance, a decentering error and a thickness error.

For example, when a die structure for molding a plurality of parts is used in injection-molding of a glass material to enhance productivity, the processing accuracy of each part and so on are accumulated. Therefore, critical values for producing objective lenses while ensuring the yielding percentage thereof include a decentering tolerance of almost ±2.5 µm that represents an allowable range of the decentering error and a thickness tolerance of almost ±1.0 µm that represents an allowable range of thickness error.

For confirming such critical values, objective lenses were actually manufactured using dies built with high precision and the critical values were calculated back from the aberration of the objective lens. As a result, an estimated decentering tolerance of almost ±2.5 µm and an estimated thickness tolerance of almost ±1.0 µm were obtained.

These variations in the respective critical values are not only limited in any injection-molding device that performs injection-molding of a glass material. It is desirable to estimate the same levels of such variations in an injection-compression molding machine, a compression molding machine, or the like.

In consideration of the production tolerance, the objective lens is allowable as long as it is designed to exert desired optical characteristics even when the decentering error and thickness error thereof are within their acceptable ranges in production. In other words, if the objective lens is designed in this way, the production of any inferior objective lens can be prevented so that the yield of the production can be improved.

Here, the term "decentering sensitivity" is referred to as a wavefront aberration level occurred when the wavefront aberration between the lens surface on the light side and the lens surface on the disk side of an objective lens is one micrometer. If there is a thickness error of +1 µm, then a wavefront aberration level generated when the lens thickness of the objective lens on the optical axis is +1 µm higher than a predetermined thickness. A k-order coma aberration (k is an uneven number of three or more), which is generated when a decentering error is 1 µm, is referred to as a k-order decentering sensitivity (DCmk). In addition, k-order spherical aberration level (k is an uneven number of three or more) generated when a thickness error is 1 µm is referred to as a k-order thickness sensitivity (TSAk). Then, the decentering sensitivity can be represented by square-root of sum of squares of the decentering sensitivities of the respective orders and the thickness sensitivity can be represented by square-root of sum of squares of the thickness sensitivities of the respective orders. However, the wavefront aberration is positive when progressing to a converging spherical wave.

A technique for reducing decentering sensitivity has been proposed as a technology that focuses attention on the yield of aberration resulting from a variation in production accuracy. This technique pays attention to aberration deterioration due to the decentering of the objective lens and sets limitations to the differential value and the second order differential value of each surface shape of the lens, so that the surface shape of the lens is less curved (see, for example, U.S. Pat. No. 4,130,938 (particularly, FIG. 4 thereof)).

SUMMARY OF THE INVENTION

By the way, if an objective lens is provided with substantially zero decentering sensitivity and substantially zero thickness sensitivity, the objective lens is not influenced from variations in production accuracy. Thus, the production yield of the objective lens can be increased. However, it has been empirically known that a design solution, by which both the decentering sensitivity and the thickness sensitivity are cut to substantially zero, can be hardly obtained.

For example, in the case of a typical objective lens 81 shown in FIG. 1, third-order thickness sensitivity TSA3, which is the principle factor of thickness sensitivity, is cut to zero as found in the specification data in Table 1. Therefore, if the decentering error is zero, then only a five or higher order spherical aberration occurs even when a thickness error reaches is cut to 1 μm. Therefore, the wavefront aberration level is kept within a small range of not more than 0.01 λrms.

TABLE 1

Table 1: Specification data (1) of typical object lens $ASP(R) = (R^2/RDY)/(1 + (1 - (1 + K)(R/RDY)^2)^{1/2})) + AR^4 + BR^6 + CR^8 + DR^{10} + ER^{12} + FR^{14} + GR^{16} + HR^{18} + JR^{20}$

| | |
|---|---|
| Refraction index n | 1.52 |
| Thickness d [mm] | 1.80 |
| Focal length f [mm] | 1.41 |

| | Lens surface on light side | Lens surface on disc side |
|---|---|---|
| RDY | 0.921626 | −1.225789 |
| K | −0.955937 | −34.174707 |
| A | 0.083943 | 0.163293 |
| B | −0.043624 | 0.038962 |
| C | 0.412558 | −0.460242 |
| D | −1.413927 | 0.014938 |
| E | 2.878932 | 0.575770 |
| F | −3.491805 | 0.178614 |
| G | 2.494273 | −0.249338 |
| H | −0.962580 | −0.977369 |
| J | 0.153745 | 0.791837 |
| TSA3 [λrms/μm] | | 0.000 |
| Dcm3 [λrms/μm] | | 0.032 |
| fc | | 1.15 |
| On-axis wavefront aberration [λrms] | | 0.005 |
| Off-axis wavefront aberration (0.3°) [λrms] | | 0.009 |

However, the objective lens 81 has a third-order decentering sensitivity (DCm3), the principle factor of the decentering sensitivity, which is as large as 0.032 λrms/μm. Therefore, if the decentering of the objective lens is 2.5 μm, all of the wavefront aberration levels are not less than 0.08 λrms as long as the thickness errors are in the range of 0 to +1 μm.

In other words, the objective lens 81 has a narrowed allowable range of decentering variation, so that a decrease in production yield can be unavoidable.

FIG. 2 is a diagram illustrating a typical objective lens 82. As shown in a list of specification data in Table 2, a third-order decentering sensitivity (DCm3), the principle factor of the decentering sensitivity, is cut to zero. However, even if the thickness error is zero, the wavefront aberration level is as large as 0.08 λrms or more when the decentering error reaches to 2.5 μm. This is based on the generation of fifth or higher order coma aberration even if the third-order coma aberration is zero. Thus, in the BD system, an influence of at least a fifth-order aberration in addition of that of the third-order aberration should be considered.

TABLE 2

Table 2: Specification data (2) of typical object lens $ASP(R) = (R^2/RDY)/(1 + (1 - (1 + K)(R/RDY)^2)^{1/2})) + AR^4 + BR^6 + CR^8 + DR^{10} + ER^{12} + FR^{14} + GR^{16} + HR^{18} + JR^{20}$

| | |
|---|---|
| Refraction index n | 1.52 |
| Thickness d [mm] | 1.80 |
| Focal length f [mm] | 1.41 |

| | Lens surface on light side | Lens surface on disc side |
|---|---|---|
| RDY | 0.916054 | −1.241101 |
| K | −0.972786 | −23.386787 |
| A | 0.080619 | 0.284451 |

TABLE 2-continued

Table 2: Specification data (2) of typical object lens

| | | |
|---|---|---|
| B | −0.044388 | −0.392189 |
| C | 0.439203 | −0.116768 |
| D | −1.494436 | 0.370971 |
| E | 2.984347 | 0.177305 |
| F | −3.541278 | −0.337636 |
| G | 2.467807 | −0.397977 |
| H | −0.925609 | 0.674266 |
| J | 0.141810 | −0.243559 |
| TSA3 [λrms/μm] | | −0.019 |
| Dcm3 [λrms/μm] | | 0.000 |
| fc | | 1.14 |
| On-axis wavefront aberration [λrms] | | 0.004 |
| Off-axis wavefront aberration (0.3°) [λrms] | | 0.010 |

In this objective lens 82, third-order decentering sensitivity TSA3, which is the principle factor of thickness sensitivity, is as large as −0.019 λrms/μm. Thus, an increase in wavefront-aberration deterioration level is evidently occurred along with an increase in thickness error. Therefore, even if a decentering level is 2.0 μm, all of the wavefront aberration levels reach to 0.07 λrms or more when the thickness error reaches to +1 μm. It means that the Marechel Criterion is not satisfied.

In other words, the objective lens 82 has narrowed allowable ranges of decentering tolerance and thickness tolerance, so that a decrease in production yield is unavoidable.

Such an objective lens is hardly designed so that both the decentering sensitivity and the thickness sensitivity are cut to zero to increase the production yield of the objective lens.

In other words, the decentering sensitivity and the thickness sensitivity are not independent from each other. There is a trade-off relationship between the decentering sensitivity and the thickness sensitivity. For example, the more the thickness sensitivity decreases, the more the decentering sensitivity increases. Thus, it is found that theses properties are hardly designed independently of each other.

Moreover, the relation between the decentering sensitivity and the thickness sensitivity of the objective lens has not been known. Thus, suitable thickness sensitivity and decentering sensitivity have been unrevealed. Furthermore, there is no idea that "an attention is focused on the thickness and decentering of an objective lens, which are principle factors of variations in the production thereof, and then both the thickness sensitivity and the decentering sensitivity are chosen so as to minimize the total aberration level generated depending on the respective actual variations to cause an increase in production yield." Therefore, it is desirable to provide an objective lens, an optical pickup, and an optical information recording/reproducing apparatus, which can easily exert desired optical characteristics, such as aberration, by minimizing unfavorable influences of variations in production.

According to an embodiment of the present invention, there is provided an objective lens for an optical pickup, having a numerical aperture of 0.8 or more and focusing a light beam of a wavelength λ of at least 450 nm or less on an optical information recording medium. In this objective lens, a wavefront-aberration deterioration level TOR, accumulative value of aberration deterioration, satisfies the following equation (1):

$$TOR = \sqrt{2.5^2(DCm3^2 + DCm5^2) + (TSA3^2 + TSA5^2)} \leq 0.07 [\lambda rms] \quad (1)$$

In the equation (1), TSA3 [λrms/μm] refers to a third-order thickness sensitivity level which is a third-order spherical aberration level generated when a thickness error from a predetermined thickness is +1 μm, TSA5 [λrms/μm] refers to a fifth-order thickness sensitivity level which is a fifth-order spherical aberration level generated when a third-order thickness sensitivity level when a thickness error from a predetermined thickness is +1 μm, DCm3 refers to a third-order decentering sensitivity level which is a third-order coma aberration level generated when a decentering error of each of lens surfaces is 1 μm, and DCm5 refers to a fifth-order decentering sensitivity level which is a fifth-order coma aberration level generated when a decentering error of each of lens surfaces is 1 μm.

The objective lens is designed by focusing attention on third- or fifth-order components of spherical aberration and coma aberration which are predominant in the BD system in which the objective lens with a numerical aperture (NA) of 0.8 or more concentrates a light beam at a wavelength of about 405 nm.

The equation (1) is prepared in consideration of a variation in thickness error (thickness tolerance) of about 1.0 μm and a variation in decentering error (decentering tolerance) of about 2.5 μm. In addition, the equation (1) defines the range of the total wavefront-aberration deterioration level which is lower than the Marechel Criterion value even though the thickness error and the decentering error become the maximum levels within the ranges of the thickness tolerance and the decentering tolerance, respectively.

Therefore, the configuration of the objective lens according to the present embodiment attains third- and fifth-order thickness sensitivity levels and third- and fifth-order decentering sensitivity levels, which satisfy the equation (1). As a result, the wavefront-aberration deterioration level of the concentrated light beam is lowered not more than the Marechel Criterion value, while the production yield of the objective lens can be markedly increased.

In the objective lens of the above embodiment, a wavefront-aberration deterioration level TOR may satisfy the following equation (2):

$$TOR = \sqrt{2.5^2 \cdot \Sigma DCmk^2 + \Sigma TSAk^2} \leq 0.07 [\lambda rms] \quad (2)$$

In the equation (2), TSAk [λrms/μm] refers to a k-order thickness sensitivity level, a k-order spherical aberration level, caused when the thickness error is +1 μm (where k is an odd number of 3 or more); and DCmk [λrms/μm] refers to a k-order decentering sensitivity level, a k-order coma aberration level, caused when the decentering error is +1 μm (where k is an odd number of 3 or more).

The objective lens is designed by focusing attention on third or higher order components of spherical aberration and coma aberration which are predominant in the above BD system. Like the equation (1), the equation (2) defines the range of the total wavefront-aberration deterioration level which is lower than the Marechel Criterion value even though the thickness error and the decentering error become the maximum levels within the ranges of the thickness tolerance and the decentering tolerance, respectively.

Therefore, the configuration of the objective lens attains a thickness sensitivity levels and a decentering sensitivity levels which satisfy the equation (2), so that the production yield of the objective lens can be further increased.

In the objective lens of the above embodiment, the third-order thickness sensitivity TSA3 satisfies the following equation (3) when a refractive index n of a structural material of the objective lens is $1.5 \leq n \leq 1.7$, and a focal length f is $0.90 \leq f \leq 2.2$.

$$-0.014 \leq TSA3 \leq -0.005 \quad (3)$$

The objective lens may be designed under the conditions of the BD system in which a wavelength of the light beam is 405 nm and the thickness of the protective layer of an optical information recording medium is 0.0875 [mm]. Under such a circumstance, in the case of the objective lens having good on-axis spherical aberration and off-axis characteristics, there is a linear relation between the third-order thickness sensitivity TSA3 and the third-order decentering sensitivity DCm3, which can approximate to each other by the equation (4) in wide ranges of the refractive index n and the focal length f as described above.

$$DCm3 = 1.660 \times TSA3 + 0.032 \quad (4)$$

As long as it is in the ranges of the above refractive index n and the focal length f, any deviation from the equation (4) can be substantially ignored. In addition, in the relation between the third-order thickness sensitivity TSA3 and the fifth-order thickness sensitivity TSA5 or the fifth-order decentering sensitivity DCm 5, a generally linear relation is established among these parameters as long as the refractive index n and the focal length f are within the ranges thereof as defined above. Therefore, any deviation from this relation can be substantially within the ignorable range.

This embodiment elucidates the relation between the thickness sensitivity and the decentering sensitivity, which has not been clarified in the related art, by using the above equation (4). Furthermore, the above equation (3) can be obtained by substituting each of the linear relational expressions of the third-order decentering sensitivity DCm3, the fifth-order thickness sensitivity TSA5, and the fifth-order decentering sensitivity DCm5 with respect to the third-order sensitivity TSA3 for the equation (1). In other words, a decrease in production yield due to a variation in production can be prevented by adjusting the third-order thickness sensitivity TSA3 to within the range defined by the equation (3).

According to another embodiment of the present invention, there is provided an optical pickup that includes a light source and an objective lens. The light source emits a light beam at a wavelength λ of at least 450 nm or less. The objective lens has a numerical aperture of 8.0 or more and focuses the light beam on an optical information recording medium. In the objective lens, a wavefront-aberration deterioration level TOR, a cumulative value of aberration deterioration, satisfies the above equation (1). In this equation, as described above, TSA3 [λrms/μm] refers to a third-order thickness sensitivity level which is a third-order spherical aberration level generated when a thickness error from a predetermined thickness is +1 μm, TSA5 refers to a fifth-order thickness sensitivity level which is a fifth-order spherical aberration level generated when a third-order thickness sensitivity level when a thickness error from a predetermined thickness is +1 μm, DCm3 refers to a third-order decentering sensitivity level which is a third-order coma aberration level generated when a decentering error of each of lens surfaces is 1 μm, and DCm5 refers to a fifth-order decentering sensitivity level which is a fifth-order coma aberration level generated when a decentering error of each of lens surfaces is 1 μm.

The configuration of the objective lens mounted on the optical pickup of this embodiment is the same as one of the above embodiment. Therefore, the configuration of the objective lens attains third- and fifth-order thickness sensitivity levels and third- and fifth-order decentering sensitivity levels, which satisfy the equation (1). As a result, the production yield of the objective lens can be further increased. In the optical pickup of the present embodiment, the wavefront-aberration deterioration level of the light beam concentrated on the optical information recording medium can be easily lowered not more than the Marechel Criterion value.

According to another embodiment of the present invention, there is provided an optical information recording/reproducing apparatus that includes a light source, an objective lens, and a position control unit. The light source emits a light beam at a wavelength λ of at least 450 nm or less. The objective lens has a numerical aperture of 0.8 or more and focusing the light beam on an optical information recording medium. In the objective lens, a wavefront-aberration deterioration level TOR, a cumulative value of aberration deterioration, satisfies the following equation (7):

$$DCm5 = A_{DCm5} \times TSA3 + B_{DCm5} \quad (7)$$

In the equation (7), TSA3 [λrms/μm] refers to a third-order thickness sensitivity level which is a third-order spherical aberration level generated when a thickness error from a predetermined thickness is +1 μm, TSA5 [λrms/μm] refers to a fifth-order thickness sensitivity level which is a fifth-order spherical aberration level generated when a third-order thickness sensitivity level when a thickness error from a predetermined thickness is +1 μm, DCm3 refers to a third-order decentering sensitivity level which is a third-order coma aberration level generated when a decentering error of each of lens surfaces is 1 μm, and DCm5 refers to a fifth-order decentering sensitivity level which is a fifth-order coma aberration level generated when a decentering error of each of lens surfaces is 1 μm. The position control unit controls the position of the objective lens so that the focus of the objective lens is placed on a desired point on the optical recording medium.

In the objective lens mounted on the optical information recording/reproducing apparatus of a the present embodiment, in a manner similar to the objective lens of the above embodiment, the configuration of the objective lens attains third- and fifth-order thickness sensitivity levels and third- and fifth-order decentering sensitivity levels, which satisfy the above equation (1). As a result, the production yield of the objective lens can be further increased. Therefore, in the optical information recording/reproducing apparatus of the present embodiment, the wavefront-aberration deterioration level of the light beam concentrated on the optical information recording medium can be easily lowered not more than the Marechel Criterion value.

According to any embodiment of the present invention, the configuration of the objective lens attains third- and fifth-order thickness sensitivity levels and third- and fifth-order decentering sensitivity levels, which satisfy the equation (1). As a result, the wavefront-aberration deterioration level due to variation in production can be easily lowered not more than the Marechel Criterion value and the production yield of the objective lens can be further increased. Therefore, the embodiments of the present invention can provide an objective lens, an optical pickup, and an optical information recording/reproducing apparatus, which can easily exert desired optical characteristics such as aberration by minimization of an influence of variations in production, respectively.

DESCRIPTION OF THE PREFERRED EMBODIMENTS

Hereinafter, modes for carrying out the present invention (hereinafter, also referred to as "embodiments") will be described with reference to the attached drawings. The embodiments will be described in the following order:
1. Embodiment
2. Design of Objective lens
3. Numerical Example
4. Operation and Effect
5. Other Embodiments

1. EMBODIMENT

1-1. Configuration of Optical Disc Device

Figure 1A:
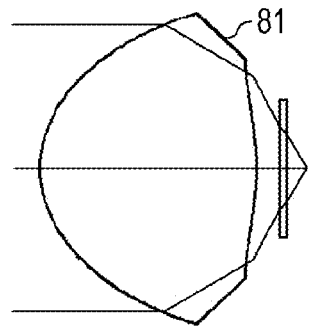
FIG. 1 is a schematic diagram illustrating the configuration and characteristic (1) of a typical objective lens.
Figure 1B:
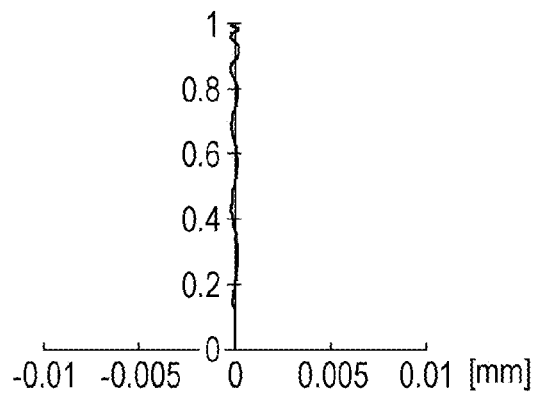
Figure 1C:
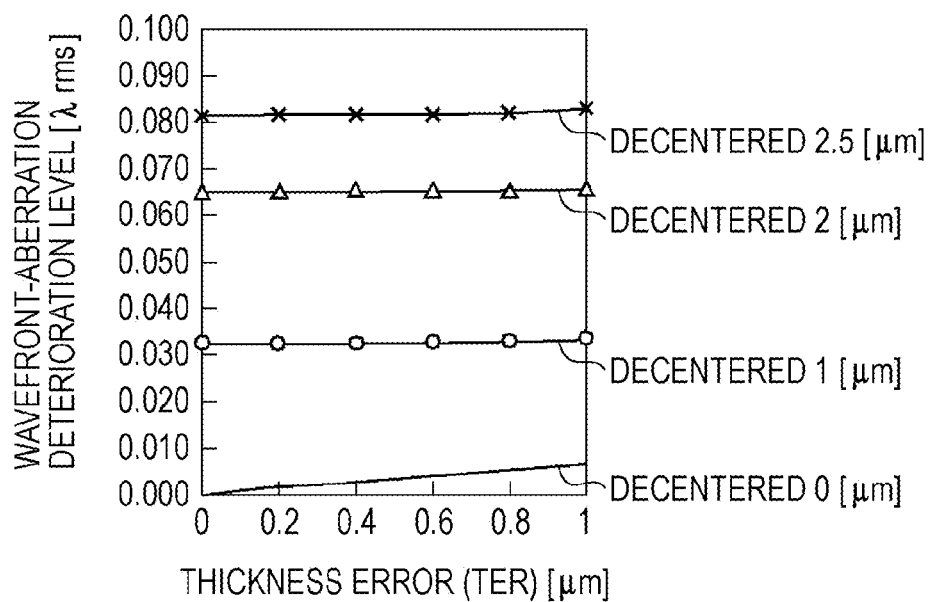
Figure 2A:
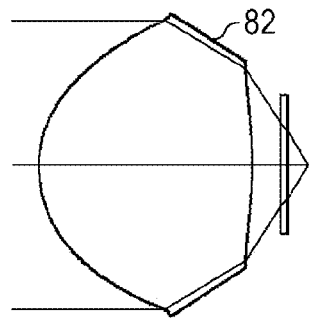
FIG. 2 is a schematic diagram illustrating the configuration and characteristic (1) of a typical objective lens.
Figure 2B:
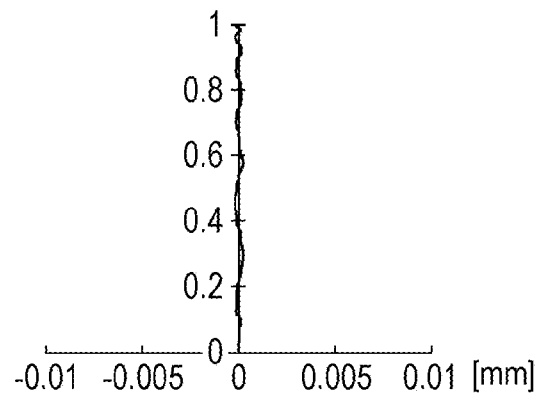
Figure 2C:
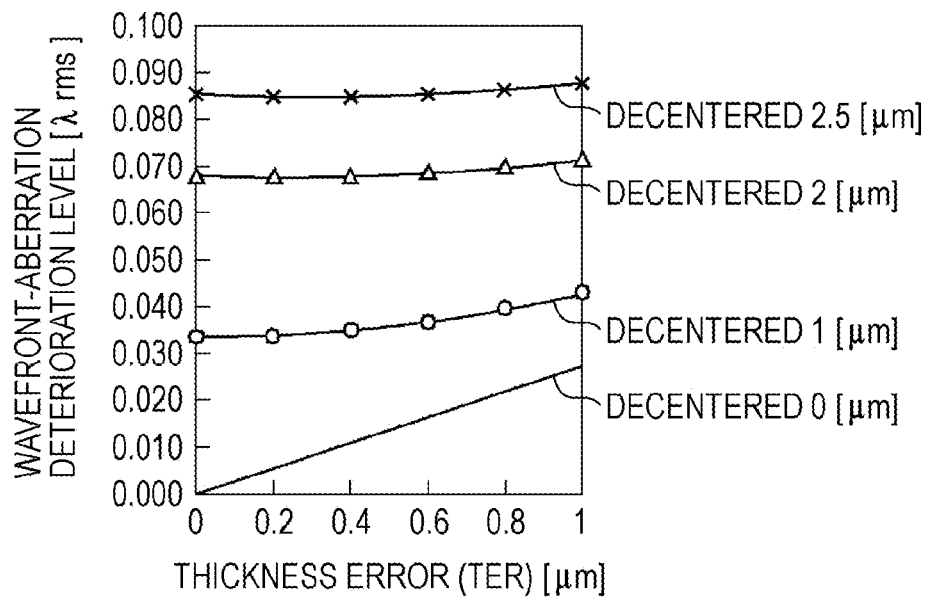
Figure 3:
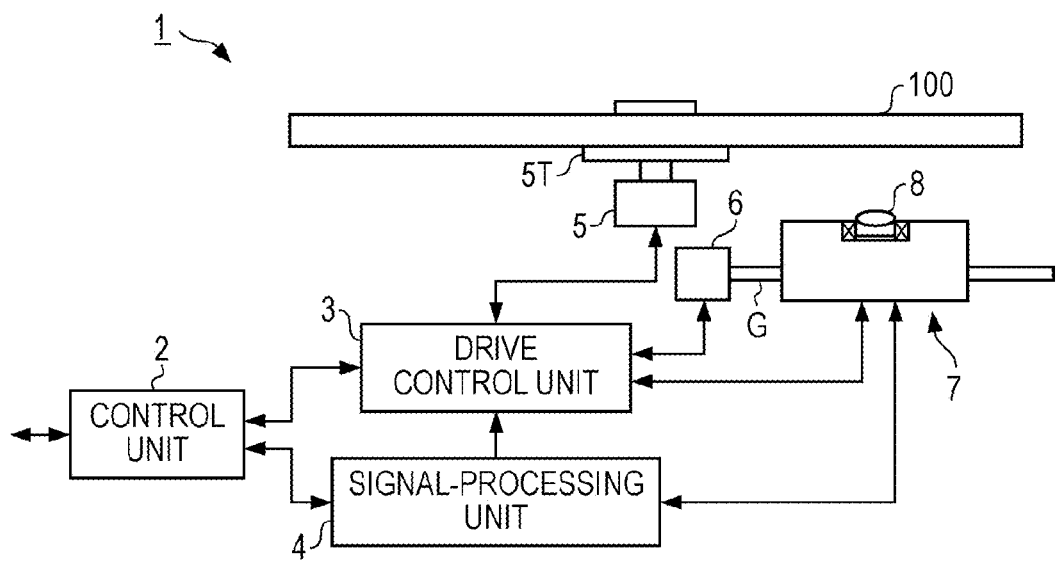
FIG. 3 is a schematic diagram illustrating the entire configuration of an optical disc apparatus.

As shown in FIG. 3, an optical disc device 1 records information on an optical disc 100, such as one of the Blu-ray Disc (BD) type, and regenerates the information from the optical disc 100. The optical disc 100 includes a recording layer with a spiral track.

A control unit 2 performs overall control on the entire optical disc device 1. The control unit 2 includes a central processing unit (CPU) (not shown) as a main component thereof. It reads out various kinds of programs from a read only memory (ROM) (not shown) and then extends the programs in a random access memory (RAM) (not shown). Therefore, the control unit 2 is allowed to execute various kinds of processing, such as information-recording processing and information-reproducing processing.

When recording the information on the optical disc 100, for example, the control unit 2 receives an information-recording command, recording information, and recording address information from an external apparatus or the like not shown in the figure and supplies the recording address information and a driving command to a drive control unit 3 and the recording information to a signal processing unit 4. Here, the term "recording address information" refers to information about a destination address where the recording information is to be recorded.

The drive control unit 3 rotates the optical disc 100 mounted on a turntable 5T at a predetermined rotational speed by controlling the drive of a spindle motor 5 in response to the drive command. In addition, the drive control unit 3 controls the drive of a thread motor 6 to move an optical pickup 7 to a position corresponding to the recording address information in the radial direction (i.e., in the inner or outer peripheral direction) of the optical disc 100 along a traveling axis G.

A signal processing unit 4 generates a recording signal by subjecting the supplied recording information to various kinds of signal processing, such as predetermined coding processing and modulation processing to generate a recording signal, followed by supplying the recording signal to the optical pickup 7.

The optical pickup 7 adjusts the focus F of a light beam L on the recording layer of the optical disk 100 by performing focus control and tracking control described later. In addition, the optical pickup 7 adjusts the light intensity of the light beam L in response to a recording signal from the signal processing unit 4 to record the information on the recording layer of the optical disc 100.

To regenerate the information from the optical disc 100, for example, the control unit 2 supplies a drive command to the drive control unit 3 and a regeneration-processing command to the signal processing unit 4 in response to an information-reproducing command or the like from an external device (not shown) or the like.

In a manner similar to the recording of information, the drive control unit 3 rotates the optical disc 100 at a predetermined rotational speed and moves the optical pickup 7 to a position corresponding to the information-regenerating command.

The optical pickup 7 adjusts the focus F of a light beam L on the recording layer of the optical disk 100 by performing focus control and a tracking control described later. In addition, the optical pickup 7 adjusts the light intensity of the light beam L to reproduction.

The light beam L is reflected by the recording layer, becoming reflected light beam LR. The optical pickup 7 detects the reflected light beam LR and then supplies a light reception signal depending on the light intensity of the reflected light beam LR.

The signal processing unit 5 performs predetermined demodulation processing, decoding processing, or the like on the supplied light reception signal to generate reproduction information, supplying the reproduction information to the control unit 2. The control unit 2 is able to send the reproduction information to an external device (not shown).

Thus, the optical disc device 1 controls the optical pickup 7 by the control unit 2 to record the information on the optical disc 100 and reproduce the information from the optical disc 100.

1-2. Configuration of Optical Pickup

Figure 4:
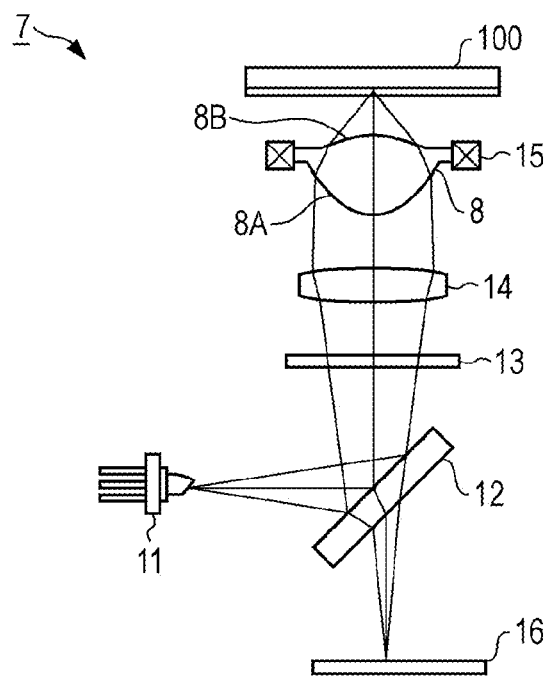
FIG. 4 is a schematic diagram illustrating the configuration of an optical pickup.

Next, the configuration of the optical pickup 7 will be described. As shown in FIG. 4, the optical pickup 7 includes a plurality of optical components.

A laser diode 11 emits a light beam L at a wavelength of about 405 nm under the control of each of the control unit 2 and the signal processing unit 4 (FIG. 3). Then the light beam L enters a polarization beam splitter 12. Here, the mounting angle and the like of the laser diode 11 are adjusted so that the light beam L can be S-polarized.

The polarization beam splitter 12 is arranged to allow the light beam to reflect on or pass through the polarization beam splitter 12 by the polarization plane 12S thereof at a certain proportion depending on the polarization direction of the light beam. Actually, the polarization beam splitter 12 reflects the S-polarization component of the incident light beam L, or substantially the whole thereof, and incidents on a ¼ wavelength plate 13. The ¼ wavelength plate 13 is provided for allowing a light beam to perform mutual conversion between a linearly polarized light beam and a circularly polarized light beam. For example, the p-polarized light beam L is converted into a left circularly polarized light and incident on a collimator lens 14. The collimator lens 14 converts the light beam L from a divergent beam to a parallel beam and then introduces the light beam into the objective lens 8.

Figure 5A:
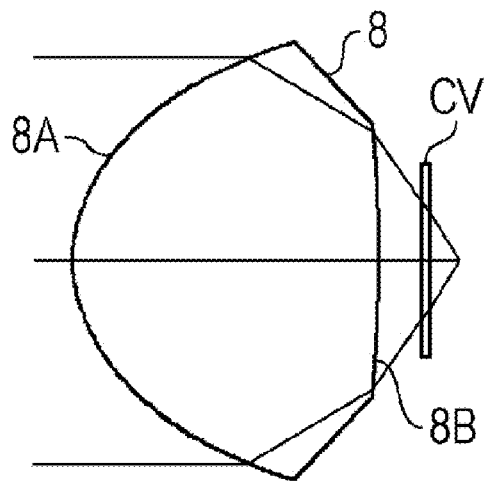
FIG. 5 is a schematic diagram illustrating the configuration of an objective lens and a longitudinal aberration diagram of an objective lens.
Figure 5B:
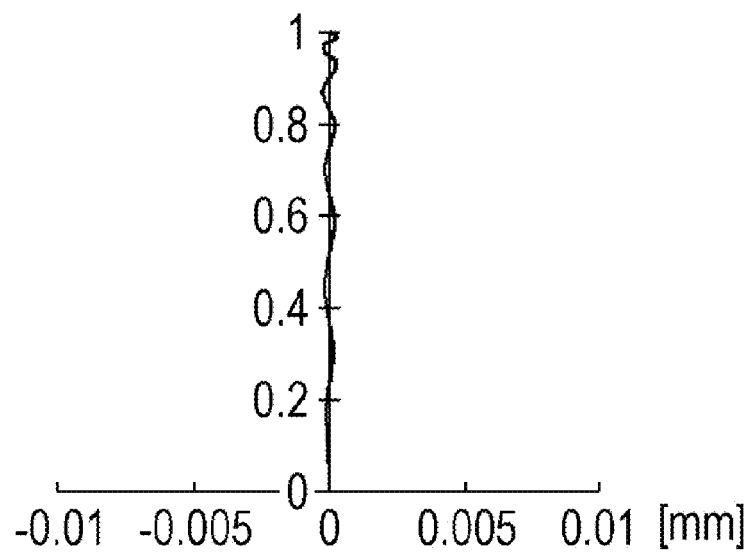

The objective lens 8 is manufactured by molding a certain glass material (such as a resin material or a glass material) in a die or the like. In addition, as shown in FIG. 5, the objective lens 8 has a lens surface 8A on the light side and a lens surface 8B on the disc side. The light beam L from the laser diode 11 is incident on the light-side lens surface 8A and then exists from the disk-side lens surface 8B that faces to the optical disc 100.

The optical disc 100 has a cover layer which is an optical component corresponding to the portion from the surface to the recording layer of the optical disc 100. In FIG. 5, an equivalent cover material CV, which is optically equivalent to the cover layer, is used for representing a light path.

Furthermore, the objective lens 8 (FIG. 4) can be moved in a focus direction and in a tracking direction by an actuator 15 under the control of the drive control unit 3. In other words, the objective lens 8 is subjected to focus control and tracking control.

Here, the term "focus direction" refers to a direction along which the objective lens 8 comes close to or moves away from the optical direction (i.e., in the vertical direction in FIG. 5) and the term "tracking direction" refers to a direction along which the objective lens 8 moves to the inner or outer peripheral side of the optical disc 100 (i.e., in the horizontal direction in FIG. 5).

The objective lens 8 concentrates the light beam L and brings the focal point F of the light beam L to the recording layer of the optical disc 100. At this time, the light beam L reflects on the recording layer of the optical disc 100 and becomes a reflected light beam LR. Here, the reflected light beam LR is a right circularly polarized light because the rotation direction of the circularly-polarized light is inverted at the time of reflection.

The reflected light beam LR is converted from a divergent beam into a parallel beam by the objective lens 8 and then converted into a convergent light by the collimator lens 14. Subsequently, the convergent light is converted into the P-polarized (linearly polarized light) by the ¼ wavelength plate 13 and then incident on the polarization beam splitter 12.

The polarization beam splitter 12 emits the reflected light beam LR (P-polarized light) to a photo detector 16 through the polarization plane 12S.

The photo detector 16 receives the irradiated reflected light beam LR by a plurality of light reception areas, generates a light reception signal depending on the amount of light received by each light reception area, and supplies the light reception signal to the signal processing unit 4.

The signal processing unit 4 performs predetermined arithmetic processing in response to the light reception signal to generate each of a focus error signal, a tracking error signal, and a regenerative RF signal.

In this way, the optical pickup 7 emits the light beam L on the recording layer of the optical disc 100 and receives the light beam LR reflected therefrom.

2. DESIGN OF OBJECTIVE LENS

2-1. Manufacture of Objective Lens

In general, the objective lens 8 is manufactured by a predetermined objective lens manufacturing apparatus using a die.

The objective lens 8 may cause a decentering error DER and a thickness error TER due to a problem in processing accuracy or positioning accuracy of the die in the objective lens manufacturing apparatus. Here, the decentering error DER refers to a misalignment between the central axis of the light-side surface 8A and the central axis of the disc-side surface 8B (FIG. 5). The thickness error TER refers to an error of spacing between the light-side surface 8A and the disc-side surface 8B.

In the manufacture of the objective lens, for example, resin (plastic) may be used as a glass material and subjected to injection molding with a so-called multi-cavity mold. In this case, the processing accuracies of the respective parts are accumulated, so that the variations of the molded objective lenses can be comparatively large. Therefore, as allowable limits, a decentering error is about 2.5 μm and a thickness error is about 1.0 μm.

In other words, the objective lens 8 may cause production tolerance in which a decentering error is about 2.5 μm at the maximum and a thickness error is about 1.0 μm at the maximum.

Here, the prospective production tolerance may be about 2.5 μm and a thickness error is about 1.0 μm at the maximum without depending on the type of a glass material of the objective lens and without depending on a manufacturing method, such as injection molding or compression molding.

2-2. Design of Objective Lens

In this embodiment, the wavefront aberration of the object lens 8 will be described, paying attention to the spherical aberration and the coma aberration. In general, the wavefront aberrations of lenses can be expressed as third or higher odd compositions, respectively.

[2-2-1. Relation of Thickness Error and Decentering Error to Wavefront Aberration Level]

First, wavefront aberration levels when changing each of the thickness error TER and decentering error DER will be described.

Figure 6:
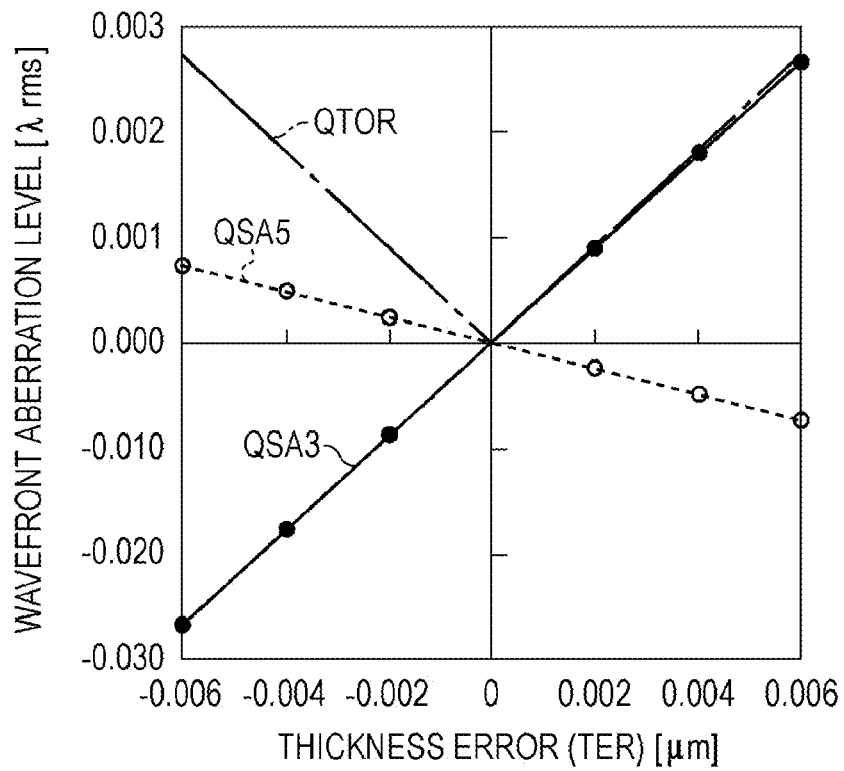
FIG. 6 is a schematic diagram illustrating the relation between a thickness error and a wavefront aberration level.

FIG. 6 is a graphical representation of a change in wavefront aberration level [λrms] when changing the thickness error TER [μm] of the exemplary objective lens 8, wherein QTOR represents a total aberration characteristic as a sum of aberrations in all of orders, QSA3 represents a third-order spherical aberration characteristic, and QSA5 represents a fifth-order spherical aberration characteristic.

In this FIG. 6, the third-order spherical aberration characteristic QSA3 shows that the level of wavefront aberration is "0 (zero)" when the level of the thickness error TER is "0(zero)" (i.e., passing through the line). In addition, the third order spherical aberration characteristic QSA3 is a straight line with a positive slope as a whole. Hereinafter, the slope, the wavefront aberration level at this slope per a thickness error TER of +1 μm, is referred to as a third-order thickness sensitivity TSA3 [λrms/μm].

Like the third-order spherical aberration characteristic QSA3, the fifth-order spherical aberration characteristic QSA5 shows that the level of wavefront aberration is "0 (zero)" when the level of the thickness error TER is "0(zero)". In addition, the fifth-order spherical aberration characteristic QSA5 is a straight line with a negative slope as a whole and the degree of slope is also comparatively small. Hereinafter, the slope, the wavefront aberration level at this slope per a thickness error TER of +1 μm, is referred to as a fifth-order thickness sensitivity TSA5 [λrms/μm].

In general, the total aberration can be expressed by the root sum square (RSS) of the third or higher order spherical aberration caused by the thickness error. Therefore, the total aberration characteristic QTOR is a broken line as a whole. In the example shown in FIG. 6, the total aberration characteristic QTOR is slightly larger than the third spherical aberration characteristic QSA3 in the positive area of the thickness error TER. In the negative area of the thickness error TER, the total aberration characteristic QTOR is represented as one in which the total aberration characteristic QTOR in the positive area of the thickness error TER is reversed with respect to the axis where the thickness error TER is zero (0). In other words, in the case of the total aberration characteristic QTOR, the more the thickness error TER moves away from the value "0

(zero)", the higher the wavefront aberration level increases so as to be proportional to the degree of the thickness error TER.

In FIG. 6, the example in which the third-order thickness sensitivity TSA3 takes a positive value is illustrated. Alternatively, for example, if the third-order thickness sensitivity TSA3 takes a negative value, then the third-order spherical aberration characteristic QSA3 is linear with a negative slope.

Thus, any of the third-order spherical aberration characteristic QSA3, the fifth-order spherical aberration characteristic QSA5, and so on is a linearly correlated with the thickness error TER. Therefore, even without a complicated calculation, the total aberration characteristic QTOR can be expressed by the third-order thickness sensitivity TSA3, the fifth-order thickness sensitivity TSA5, and so on, which respectively correspond to the slopes of the third-order spherical aberration characteristic QSA3, the fifth-order spherical aberration characteristic QSA, and so on.

Figure 7:
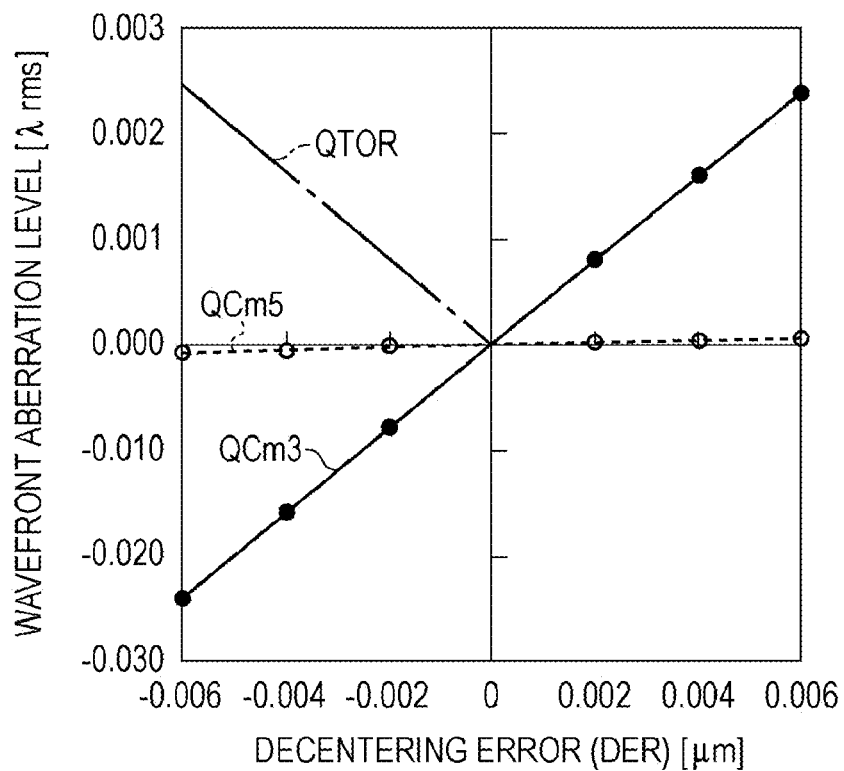
FIG. 7 is a schematic diagram illustrating the relation between a decentering error and a wavefront aberration level.
Figure 8A:
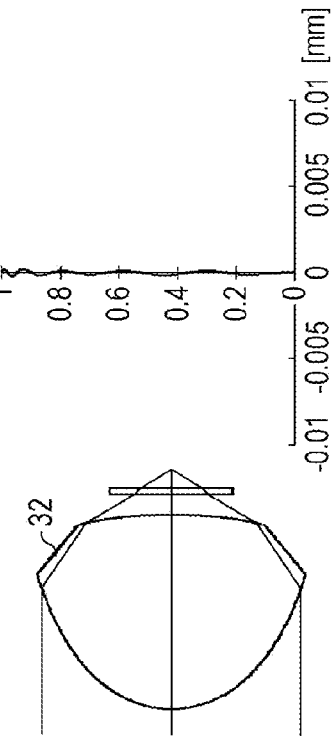
FIG. 8 is a schematic diagram illustrating an exemplary design of an objective lens with a change in third-order thickness sensitivity and a longitudinal aberration diagram thereof.
Figure 8B:
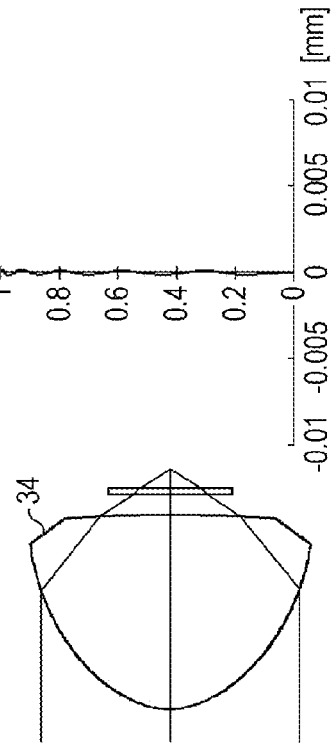
Figure 8C:
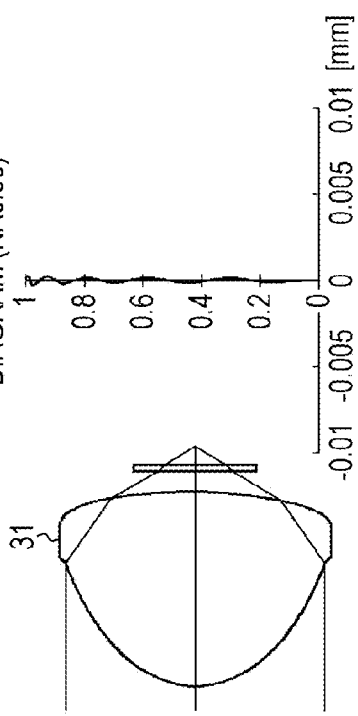
Figure 8D:
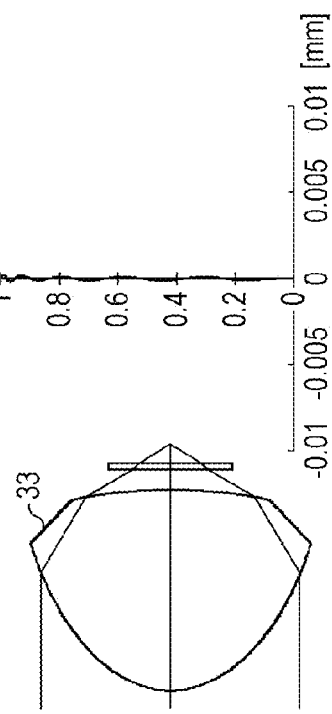

FIG. 7 is a graphical representation of a change in wavefront aberration level [λrms] when changing the decentering error DER of the exemplary objective lens 8, wherein QTOR represents a total aberration characteristic as a sum of aberrations in all of orders, QCm3 represents a third-order coma aberration characteristic, and QCm5 represents a fifth-order coma aberration characteristic.

In this FIG. 7, like the third-order spherical aberration characteristic QSA3, the third-order coma aberration characteristic QCm3 shows that the level of wavefront aberration is "0 (zero)" when the level of the decentering error DER is "0(zero)". In addition, the third-order coma aberration characteristic QCm3 is a straight line with a positive slope as a whole. Hereinafter, the slope, the wavefront aberration level at this slope per a decentering error DER of 1 μm, is referred to as a third-order decentering sensitivity DCm3 [λrms/μm].

Like the third-order coma aberration characteristic QCm3, the fifth-order coma aberration characteristic QCm5 shows that the level of wavefront aberration is "0 (zero)" when the level of the decentering error DDER is "0 (zero)". In addition, the fifth-order coma aberration characteristic QCm5 is almost a straight line as a whole, while the slope of the line is substantially "0 (zero)". Hereinafter, the slope, the wavefront aberration level at this slope per a decentering error DER of 1 μm, is referred to as a fifth-order decentering sensitivity DCm5 [λrms/μm].

Therefore, like the one shown in FIG. 6, the total aberration characteristic QTOR is a broken line as a whole. In the example shown in FIG. 7, the total aberration characteristic QTOR is substantially the same as the third coma aberration characteristic QCm3 in the positive area of the decentering error DER. In the negative area of the decentering error DER, the total aberration characteristic QTOR is represented as one in which the total aberration characteristic QTOR in the positive area of the decentering error DER is reversed with respect to the axis where the decentering error DER is zero (0). In other words, in the case of the total aberration characteristic QTOR, the more the decentering error DER moves away from the value "0 (zero)", the higher the wavefront aberration level increases so as to be proportional to the degree of the decentering error DER.

Although not shown in the figure, the seventh or higher order spherical aberration characteristic and coma aberration characteristic can be straight lines passing through the origins, respectively.

That is, each of the third coma aberration characteristic QCm3, the fifth-order coma aberration characteristic QCm5, and so on is linear with respect to the decentering error DER. Therefore, even without a complicated calculation, the total aberration characteristic QTOR can be expressed by the third-order decentering sensitivity DCm3, the fifth-decentering sensitivity DCm5, and so on, which respectively correspond to the slopes of the third-order decentering sensitivity DCm3, the fifth-order decentering aberration characteristic DCm5, and so on.

It is found that the objective lens 8 has a proportional relation between the thickness error TER and the spherical aberration of each of different orders and also a proportional relation between the decentering error DER and the spherical aberration of each of different orders.

[2-2-2. Relation Between Third Order Sensitivity and Other Aberration Sensitivity]

Next, as shown in FIG. 8A to FIG. 8D, objective lenses 31 to 34 with different variations of third-order thickness sensitivity TSA3 were designed.

The shape of each surface of each of the objective lenses 31 to 34 was represented as a light axis ASP (R) from the tangent plane on the light axis of a point at a distance R from the light axis. The distance ASP (R) could be represented by the following equation (5):

$$ASP(R) = \frac{\frac{R^2}{RDY}}{1 + \sqrt{1 - (1+K)\left(\frac{R}{RDY}\right)^2}} + AR^4 + BR^6 +$$

$$CR^8 + DR^{10} + ER^{12} + FR^{14} + GR^{16} + HR^{18} + JR^{20}$$

The specification data of the objective lens obtained under such a condition are listed in Table 3.

TABLE 3

Table 3: Design example of objective lens with different third-order thickness sensitivities

| | | Objective lens | | | |
|---|---|---|---|---|---|
| | | 31 | 32 | 33 | 34 |
| Lens surface on light side | RDY | 0.942659 | 0.925854 | 0.917567 | 0.921059 |
| | K | −0.763419 | −0.958001 | −0.954311 | −0.942921 |
| | A | 0.045638 | 0.083570 | 0.084204 | 0.087192 |
| | B | −0.028853 | −0.045079 | −0.042869 | −0.050463 |
| | C | 0.290891 | 0.412535 | 0.413840 | 0.427528 |
| | D | −0.926985 | −1.414547 | −1.414713 | −1.424365 |
| | E | 1.804220 | 2.879022 | 2.876128 | 2.865277 |
| | F | −2.123451 | −3.493461 | −3.486028 | −3.464546 |
| | G | 1.492622 | 2.494821 | 2.493651 | 2.493525 |
| | H | −0.575145 | −0.961743 | −0.965999 | −0.981880 |
| | J | 0.093294 | 0.152965 | 0.155579 | 0.163613 |
| Lens surface on disk side | RDY | −1.539632 | −1.214780 | −1.236848 | −1.227302 |
| | K | −26.805931 | −33.650379 | −34.586920 | −41.230149 |
| | A | 0.623682 | 0.146257 | 0.168047 | 0.137841 |
| | B | −1.915538 | 0.014369 | 0.071084 | 0.164891 |
| | C | 3.707536 | −0.436354 | −0.466585 | −0.356358 |
| | D | −4.099108 | 0.100793 | −0.125289 | −0.243512 |
| | E | 0.172290 | 0.512372 | 0.753528 | 0.363779 |
| | F | 5.973958 | 0.008253 | 0.267632 | 1.146395 |
| | G | −6.142005 | −0.402746 | −0.223341 | −0.669245 |
| | H | 0.988069 | −0.234018 | −1.508005 | −2.059470 |
| | J | 0.827482 | 0.328691 | 1.175990 | 1.698062 |
| TSA3 [λrms/μm] | | −0.019 | −0.007 | 0.004 | 0.018 |
| On-axis wavefront aberration [λrms] | | 0.003 | 0.005 | 0.004 | 0.004 |
| Off-axis wavefront aberration (0.3°) [λrms] | | 0.009 | 0.009 | 0.009 | 0.013 |

The design conditions were as follows: The focal length f of the objective lens is 1.41 mm, the wavelength λ of the light beam L is 405 nm, the refractive index n of a glass material is 1.52, the thickness d of the objective lens of 1.80 mm, and the thickness of the cover layer of the optical disc 100 is 0.0875 mm. Under such design conditions, both the on-axis characteristic and the off-axis characteristic were well correlated.

Figure 9:
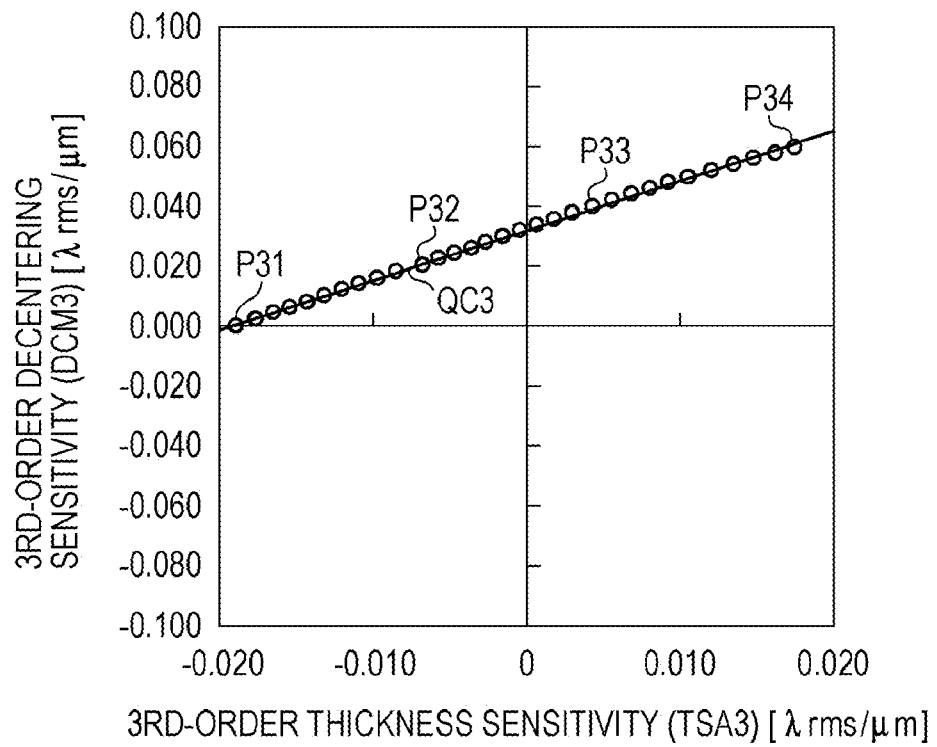
FIG. 9 is a schematic diagram illustrating the relation between third-order thickness sensitivity and third-order decentering sensitivity.

For each of these objective lenses 31 to 34, the relation between the third-order thickness sensitivity TSA3 and the third decentering sensitivity DCm3 was plotted. As a result, each of calculated points P31 to P34 was obtained as shown in FIG. 9. In the figure, a white circle represents each of the calculated points. This relation causes a change in shape while almost keeping aplanats in the whole lens system in the high NA region and corresponds to a change in distribution of refractive power that acts on light at the outer periphery of each plane.

Furthermore, under the same design conditions, a plurality of objective lenses with different variations in third-order thickness sensitivity TSA3 was designed. The relation between the third-order thickness sensitivity TSA3 and the third-order decentering sensitivity DCm3 of each objective lens was plotted. As a result, calculated points were obtained like those shown in FIG. 9, respectively.

As is evident from each calculated point shown in FIG. 9, it is found that the relation between the third-order thickness sensitivity TSA3 and the third decentering sensitivity DCm3 is almost linearly changed depending on the third-order thickness sensitivity TSA3. Hereinafter, this straight light is referred to as a characteristic curve QC3. In other words, the relation between the third-order thickness sensitivity TSA3 and the third-order decentering sensitivity DCm3 can be represented by the following equation (6) using coefficients $A_{DCm3}$ and $B_{DCm3}$.

$$DCm3 = A_{DCm3} \times TSA3 + B_{DCm3} \quad (6)$$

For each of the designed objective lenses, the relation between the third-order thickness sensitivity TSA3 and the fifth-order decentering sensitivity DCm5 was also plotted in a manner similar to one described above. As a result, calculated points were obtained like those shown in FIG. 10, respectively.

Figure 10:
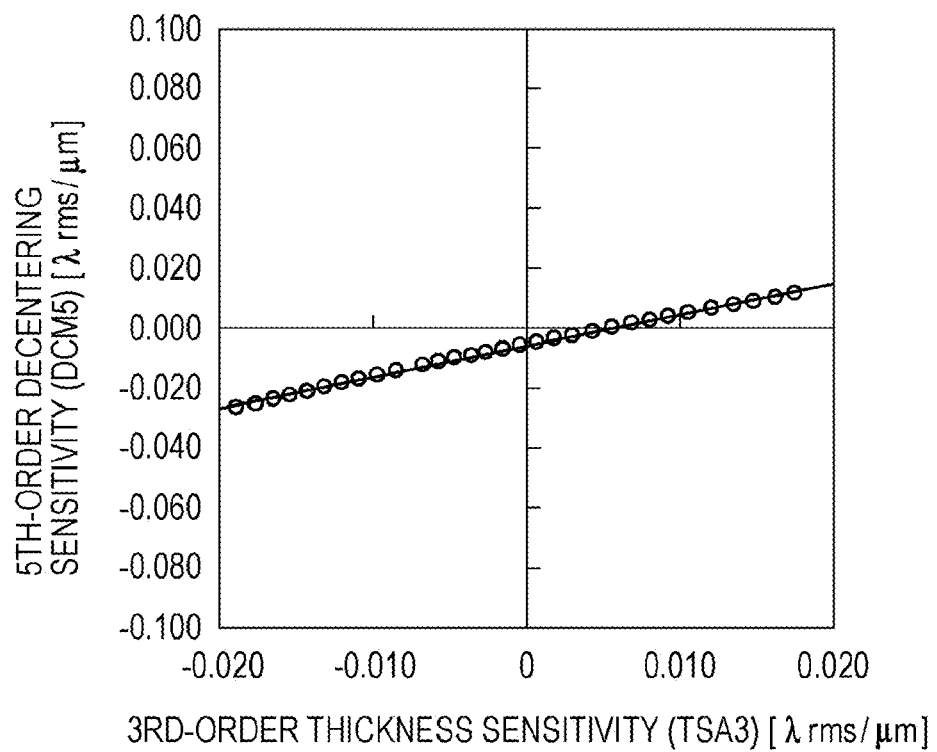
FIG. 10 is a schematic diagram illustrating the relation between third-order thickness sensitivity and fifth-order decentering sensitivity.

As is evident from each calculated point shown in FIG. 10, it is found that the relation between the third-order thickness sensitivity TSA3 and the fifth decentering sensitivity DCm5 is almost linearly changed depending on the third-order thickness sensitivity TSA3 just as in the case with the third-order decentering sensitivity DCm3 (FIG. 9). In other words, the relation between the third-order thickness sensitivity TSA3 and the fifth-order decentering sensitivity DCm5 can be represented by the following equation (7) using coefficients $A_{DCm5}$ and $B_{DCm5}$.

$$DCm5 = A_{DCm5} \times TSA3 + B_{DCm5} \quad (7)$$

Furthermore, for each of the designed objective lenses, the relation between the third-order thickness sensitivity TSA3 and the fifth-order thickness sensitivity TSA5 was also plotted in a manner similar to one described above. As a result, calculated points were obtained like those shown in FIG. 11, respectively.

Figure 11:
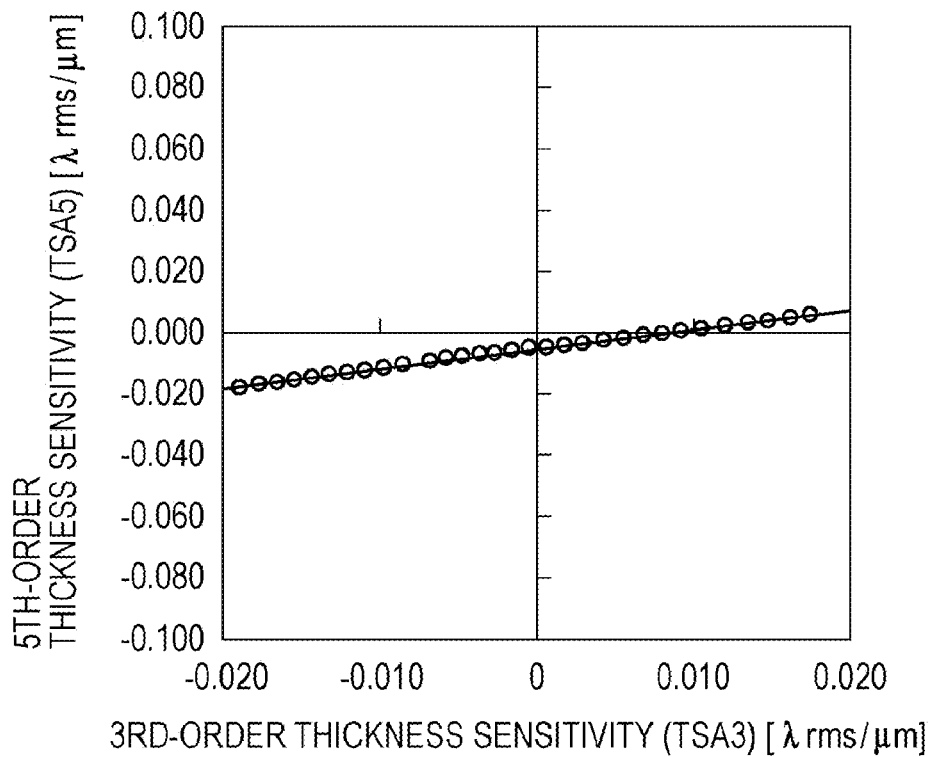
FIG. 11 is a schematic diagram illustrating the relation between third-order thickness sensitivity and fifth-order thickness sensitivity.

As is evident from each calculated point shown in FIG. 11, it is found that the relation between the third-order thickness sensitivity TSA3 and the fifth-order thickness sensitivity TSA5 is almost linearly changed depending on the third-order thickness sensitivity TSA3 just as in the case with the third decentering sensitivity DCm3 (FIG. 9). In other words, the relation between the third-order thickness sensitivity TSA3 and the fifth-order thickness sensitivity TSA5 can be represented by the following equation (8) using coefficients $A_{TSA5}$ and $B_{TSA5}$.

$$TSA5 = A_{TSA5} \times TSA3 + B_{TSA5} \quad (8)$$

Here, each of variables other than the third-order thickness sensitivity TSA3 in the equations (6) to (8) (specifically the fifth-order thickness sensitivity TSA5, the third-order decentering sensitivity DCm3, or the fifth decentering sensitivity Dcm 5) is represented by a variable z for the sake of convenience. Then, each of the coefficients Az and Bz was calculated in particular and each of values listed in Table 4 was obtained.

TABLE 4

Table 4: Coefficients of approximate straight light
$Z = A_z \times TSA3 + B_z$

| Z | $A_z$ | $B_z$ |
|---|---|---|
| TSA5 | 0.643 | −0.005 |
| TSA7 | 0.323 | −0.004 |
| TSA9 | 0.134 | −0.001 |
| DCm3 | 1.660 | 0.032 |
| DCm5 | 1.046 | −0.005 |
| DCm7 | 0.585 | −0.006 |
| DCm9 | 0.257 | −0.003 |

Here, Table 4 also represents variables A and B that represent the relation between the third-order thickness sensitivity TSA3 and the seventh-order thickness sensitivity TSA7 and the relation between the third-order thickness sensitivity TSA3 and the ninth-order thickness sensitivity TSA9, respectively. Furthermore, Table 4 also represents variables A and B that represent the relation between the third-order thickness sensitivity TSA3 and the seventh-order decentering sensitivity DCm7 and the relation between the third-order thickness sensitivity TSA3 and the ninth-order decentering sensitivity DCm9. In the following description, as a matter of convenience for description, k-order thickness sensitivity is represented as TSAk and k-order decentering sensitivity is represented as DCmk. Here, the variable k is an odd number of 3 or more.

Furthermore, for each of the objective lenses, it is found that there is a linear relation between the third thickness sensitivity TSA3 and each of the third-order decentering sensitivity DCm3, the fifth decentering sensitivity DCm5, and the fifth-order thickness sensitivity TSA5, which can be represented by a linear function, such as one represented by any of the formulae (6) to (8).

[2-2-3. Calculation of Wavefront-Aberration Degradation Level]

By the way, each of the k-order thickness sensitivity TSAk and the k-order decentering sensitivity DCmk is the deterioration sensitivity of aberration with respect to production tolerance. Therefore, if the above decentering tolerance of 2.5 μm and the above thickness tolerance of 1.0 μm are used, the accumulation of aberration deterioration of the respective orders (hereinafter referred to as wavefront-aberration deterioration) TOR can be represented by the following equation (9):

$$TOR = \sqrt{2.5^2 \cdot \Sigma DCmk^2 + \Sigma TSAk^2} \quad (9)$$

In the equation (9), the coefficient of the term of the decentering sensitivity DCmk, $2.5^2$, is obtained by the square of a decentering tolerance level. In addition, there is no explicit coefficient on the term of the thick sensitivity TSAk but "1 (one)", which is the square of a thickness tolerance level.

In the equation (9), the influences of the thickness sensitivity TSA and the decentering sensitivity DCm of seventh or higher order may be comparatively small. Then, if the thickness sensitivity TSA and the decentering sensitivity DCm of seventh or higher order are omitted from the equation (9), then it can be represented by the following equation (10):

$$TOR = \sqrt{2.5^2(DCm3^2 + DCm5^2) + (TSA3^2 + TSA5^2)} \quad (10)$$

Figure 12:
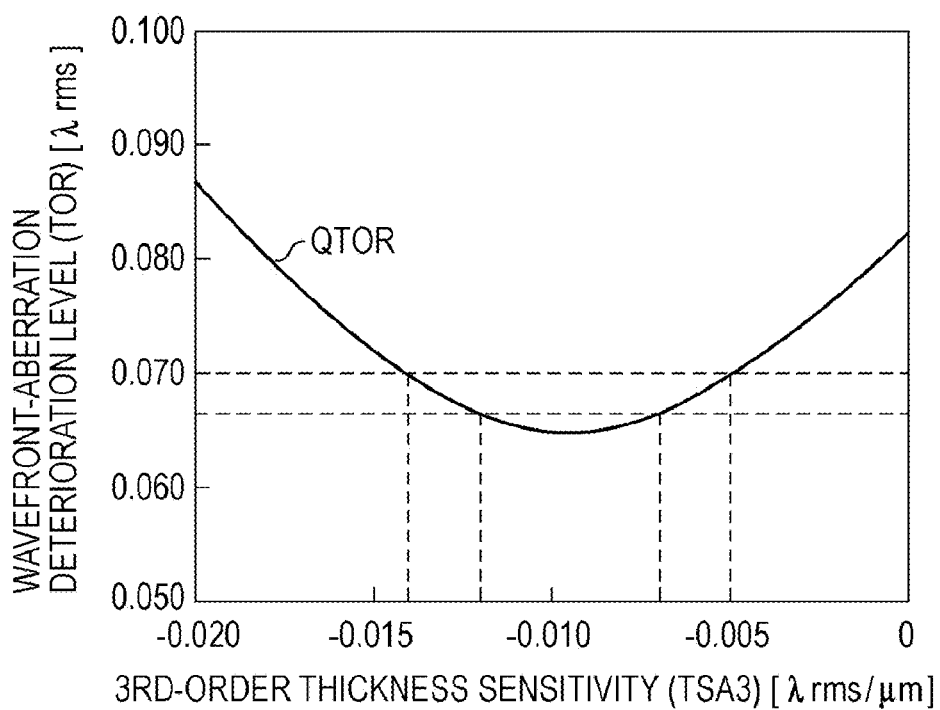
FIG. 12 is a schematic diagram illustrating the relation between third-order thickness sensitivity and a wavefront-aberration deterioration level.

Here, if the equations (6) to (7) are substituted into the equation (10), then the wavefront-aberration deterioration level TOR serves as a function using only the third-order thickness sensitivity TSA3 as a variable. Therefore, the relation between the third thickness sensitivity TSA3 and the wavefront aberration deterioration level TOR was graphically represented. As a result, a characteristic curve QTOR was obtained as shown in FIG. 12.

On the other hand, the Marechel Criterion value, the following equation (11), has been known as an upper limit of the aberration level.

$$TOR \leq 0.07[\lambda rms] \quad (11)$$

Furthermore, the equation (10) and the equation (11) are combined together to obtain the following equation (12):

$$TOR = \sqrt{2.5^2(DCm3^2 + DCm5^2) + (TSA3^2 + TSA5^2)} \leq 0.07[\lambda rms] \quad (12)$$

Namely, if the decentering tolerance is of 2.5 μm and the thickness tolerance is 1.0 μm, then the objective lens 8 can be provided with desired optical characteristics within these restrictions as long as the equation (12) is satisfied.

In addition, from the characteristic curve QTOR shown in FIG. 12, the third-order thickness sensitivity TSA3 that satisfies the Marechel Criterion is in the range defined by the following equation (13):

$$-0.014 \leq TSA3 \leq -0.005 \quad (13)$$

In other words, if the objective lens 8 is designed so that the third-order sensitivity TSA3 satisfies the equation (13), the wavefront aberration level to be generated can be lowered even if both the decentering error DER and the thickness error TER vary within the allowable ranges of the decentering tolerance and the thickness tolerance.

In other words, the objective lens 8 designed as described above leads to an increase in so-called fabrication yield, or keeps the occurrence of inferior goods which do not exert the desired optical characteristics thereof in production extremely low.

The following description will discuss an almost 95 percent reduction in upper limit of the aberration level with reference to the Marechel Criterion. In this case, with reference to the characteristic curve QTOR shown in FIG. 12, the third thickness sensitivity TSA3 is in an allowable range defined by the following equation (14):

$$-0.012 \leq TSA3 \leq -0.007 \quad (14)$$

Under such a condition, the object lens 8 expands the allowable ranges of the decentering tolerance and the thickness tolerance which can satisfy the desired optical characteristics in comparison with those within the ranges defined by the equation (13). In other words, the objective lens 8 in production increases its possibility of exerting the desired optical characteristics even if the decentering error DER and the thickness error TER of the objective lens 8 exceeds somewhat a decentering tolerance of 2.5 μm and a thickness tolerance of 1.0 μm. As a result, the occurrence probability of inferior goods can be reduced still further.

In the following description, a further reduction in upper limit of the aberration level with reference to the Marechel Criterion will be discussed. From the characteristic curve QTOR shown in FIG. 12, for example, the third-order thickness sensitivity TSA3 may be restricted within the allowable range defined by the following equation (15):

$$-0.011 \leq TSA3 \leq -0.009 \quad (15)$$

Under such a condition, the object lens 8 further expands the allowable ranges of the decentering tolerance and the thickness tolerance which can satisfy the desired optical characteristics in comparison with those within the ranges defined by the equation (13) or (14). In other words, the objective lens 8 in production increases its possibility of exerting the desired optical characteristics even if the decentering error DER and the thickness error TER of the objective lens 8 exceeds somewhat a decentering tolerance of 2.5 μm and a thickness tolerance of 1.0 μm. As a result, the occurrence probability of inferior goods can be reduced markedly.

Here, the more the level of the third-thickness sensitivity TSA3 objective lens becomes small, the more the objective lens 8 can extends a working distance between the disc-side lens surface 8B and the optical disc 100. Likewise, the more the level of the third-thickness sensitivity TSA3 objective lens becomes small, the more the objective lens 8 can exerts an additional effect of reducing the sag amount and the maximum angle of inclination of the light-side lens surface 8A.

Therefore, if the objective lens 8 is designed so that the third-order sensitivity TSA3 satisfies the equation (13), the wavefront-aberration deterioration level TOR becomes not more than the Marechel Criterion as long as both the decentering tolerance and the thickness tolerance are within the respective allowable ranges. As a result, the occurrence probability of inferior goods in production can be reduced without fail.

Furthermore, if the objective lens 8 is designed so that the third-order sensitivity TSA3 satisfies the equation (14) or (15), the allowable ranges of the decentering error DER and the thickness error TER are expandable. As a result, the occurrence probability of inferior goods in production can be reduced still further.

[2-2-4. Change in Design Condition]

Next, various objective lenses with good on-axis characteristics and off-axis characteristics were designed by changing the focal length f, the refractive index n, and the length thickness d of each of these objective lenses within the allowable ranges defined by the equations (16) to (18) described below. However, the wavelength λ of the optical beam L is fixed at 405 nm and the thickness of the cover layer of the optical disc 100 is fixed at 0.0875 mm.

$$0.90 < f < 2.20 \quad (16)$$

$$1.50 < n < 1.70 \quad (17)$$

$$1.00 < d < 2.90 \quad (18)$$

Figure 13:
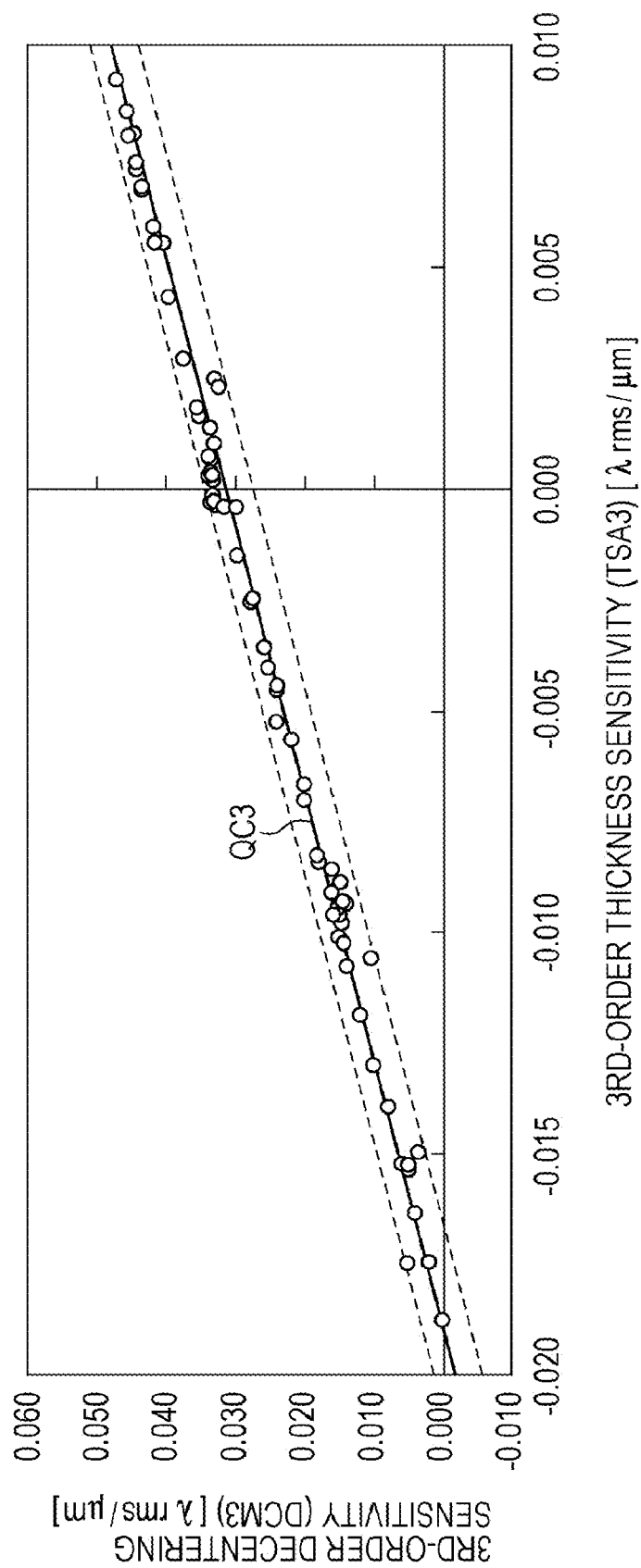
FIG. 13 is a schematic diagram illustrating the relation between third-order thickness sensitivity and third-order decentering sensitivity when changing a condition value.

For each of these objective lenses, the relation between the third-order thickness sensitivity TSA3 and the third decentering sensitivity DCm3 was plotted. As a result, each of calculated points was obtained as shown in FIG. 13. In FIG. 13, the characteristic curve QC3 is superimposed on the calculated points so as to correspond to FIG. 9 to represent the relation between the third-order thickness sensitivity TSA3 and the third-order decentering sensitivity DCm3 just as in the case with FIG. 9.

Here, an offset amount from the characteristic curve QC3 (i.e., a fluctuation range in the direction along the axis of the third-order decentering sensitivity DCm3) is defined as "Y", it is found that each calculated point is within a very small range that keeps the offset amount Y within −0.004<Y<0.003 as represented by the broken line in the figure.

In other words, the above equation (6) holds based on the relation between the three decentering sensitivity DCm3 and the third-order thickness sensitivity TSA3, where the focal length f of the objective lens, the refractive index n of the glass material, and the thickness d of the objective lens are constant. However, the above equation (6) also holds even in a wide range of each parameter, for example a focal distance f of 0.9 to 2.2 mm, a glass material's refractive index n of 1.50 to 1.70, and an objective lens's thickness of 1.00 to 2.90 mm. It is found that a misalignment from the linear relation is within a substantially ignorable range.

Even though the details will be omitted, the equation (7), which is obtained as a relation between the fifth-order decentering sensitivity DCm5 and the third-order thickness sensitivity TSA3, also holds with sufficient accuracy even though the focal distance f, the refractive index n, and the objective lens's thickness d are within their respective ranges of the equations (16) to (18). Likewise, the equation (8), which is obtained as a relation between the fifth-order thickness sensitivity TSA5 and the third-order thickness sensitivity TSA3, also holds with sufficient accuracy even though the focal distance f, the refractive index n, and the objective lens's thickness d are within their respective ranges of the equations (16) to (18). Much the same is true on each kind of seven or higher order aberration and each kind of seven or higher order sensitivity.

That is, if the objective lens satisfies the conditions of the equations (16) to (18) and the condition of any one of the equations (13), (14), and (15), it means that the wavefront aberration level to be generated can be comparatively lowered even if the decentering error DER and the thickness error TER vary within the allowable ranges of decentering tolerance and thickness tolerance.

Furthermore, the condition of the equation (17) may be further restricted for the refractive index n. A plastic glass material may be chosen using the range represented by the following equation (19). In this case, the range of the offset amount Y is further restricted, so that each calculated point can be close to the characteristic curve QC3. The wavefront aberration level with respect to a change in each of the decentering error DER and the thickness error TER can be lowered, rather than the case of the equation (17).

$$1.50 < n < 1.60 \quad (19)$$

Furthermore, the objective lens 8 may be made of a material with an Abbe number $v_d$ in the range defined by the following equation (20) to keep the spherical aberration generated by a change in wavelength small. Therefore, the objective lens 8 can exert stable optical characteristics even though the wavelength of the optical beam L varies depending on a change in temperature or the like of the laser diode 11 (FIG. 4) in the case of, for example, recording the information on the optical disc 100 in particular.

$$50 \leq v_d \leq 60 \quad (20)$$

In general, as an equation of the Fraunhofer condition using a refractive index n, a focal distance f [mm], and a paraxial radius r1 [mm], the following equation (21) is known in the art.

$$fc = \frac{n^2}{n^2-1} \frac{r_1}{f}, \quad (21)$$

$$1.05 < fc < 1.25$$

If the objective lens 8 is designed to satisfy the equation (21), coma aberration caused by the off-axial incidence of a light flux can be kept extremely small. At this time, due to a fabrication tolerance or the like of the optical pickup 7, the objective lens 8 can keep the wavefront aberration level small even when the optical axis of the objective lens 8 inclines with respect to the optical axis of the incident light beam L (when the so-called light flux falls).

Furthermore, cases where each of the decentering tolerance and the thickness tolerance is different from the previous one were also investigated. Specifically, as shown in Table 5 below, combinations of decentering tolerance and thickness tolerance are represented as common tolerance condition CT (decentering tolerance [μm], thickness tolerance [μm]): CT1 (1, 0, 1.0); CT2 (2.0, 1.0); CT3 (3.0, 1.0); CT4 (1.0, 2.0); and CT5 (1.0, 3.0).

TABLE 5

Table 5: Range of third-order thickness sensitivity when common tolerance is changed

| Tolerance condition | Decentering variation [μm] | Thickness variation [μm] | Third-order thickness sensitivity TSA3 [λrms/μm] | | Wavefront-aberration deterioration level TOR [λrms] |
|---|---|---|---|---|---|
| | | | Lower limit | Upper limit | |
| CT0 | 2.5 | 1.0 | −0.014 | −0.005 | 1.0 × 0.07 |
| | | | −0.012 | −0.007 | 0.95 × 0.07 |
| CT1 | 1.0 | 1.0 | −0.014 | +0.001 | 0.5 × 0.07 |
| CT2 | 2.0 | 1.0 | −0.016 | −0.003 | 0.9 × 0.07 |
| CT3 | 3.0 | 1.0 | −0.012 | −0.008 | 1.1 × 0.07 |
| CT4 | 1.0 | 2.0 | −0.009 | +0.004 | 0.6 × 0.07 |
| CT5 | 1.0 | 3.0 | −0.007 | +0.006 | 0.7 × 0.07 |

Figure 14:
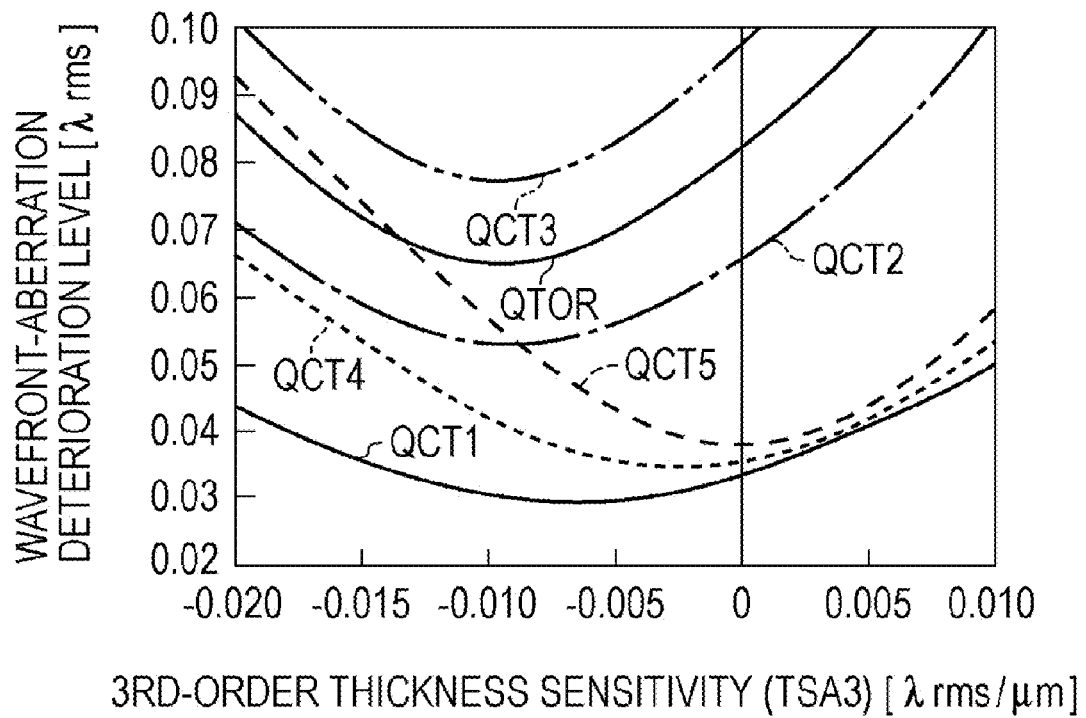
FIG. 14 is a schematic diagram illustrating the relation between third-order thickness sensitivity and a wavefront-aberration deterioration level under different tolerance conditions.

A wavefront-aberration deterioration level TOR was calculated as a function of the third-order thickness sensitivity TSA3 using any of these common tolerance conditions CT1 to CT5. As a result, characteristic curves QCT1 to QCT5 were obtained as shown in FIG. 14. In FIG. 14, a comparative characteristic curve QTOR is also represented just as in the case with FIG. 12, employing a common tolerance condition CT0 in which a decentering tolerance is 2.5 μm and a thickness tolerance is 1.0 μm.

For each of the characteristic curves QCT1 to QCT5, a range of third-order thickness sensitivity TSA3 by which the wavefront aberration deterioration level TOR becomes comparatively small is searched while a threshold was suitably changed from the Marechel criterion value (0.07 λrms). As a result, the upper limit and lower limit of the third-order thickness sensitivity TSA3 as shown in Table 5 were obtained, respectively.

If the decentering tolerance and the thickness tolerance are different from each other, the characteristic curve of the wavefront aberration deterioration level TOR is also changed. Thus, the range of the third-order thickness sensitivity TSA3 that satisfies the Marechel Criterion value is changed suitably. In this case, the range of the third-order thickness sensitivity TSA3 can be further changed by changing the available range of the wavefront aberration deterioration level TOR.

In other words, depending on the decentering tolerance and the thickness tolerance of the objective lens in an objective lens manufacturing apparatus, the wavefront aberration deterioration level TOR can be lowered not more than a desired threshold as long as the third-order thickness sensitivity TSA3 is in the ranges of upper and lower limits.

In the case of the objective lens 8, therefore, the wavefront aberration deterioration level TOR can be lowered not more than a desired threshold by suitably defining an available range of the third-order thickness sensitivity TSA3 depending on the decentering tolerance and the thickness tolerance. As a result, the occurrence probability of inferior goods in production can be reduced still further.

3. NUMERICAL EXAMPLE

Hereinafter, objective lenses 41 to 51 were designed by changing the conditions of focal length f, glass material's refractive index n, and objective lens's thickness d so as to satisfy the above equation (12), respectively.

Here, each of the objective lenses 41 to 51 was a single object lens with a numerical aperture (NA) of 0.85, on which a light beam L at a wavelength of 405 nm was incident as a parallel beam. In addition, the cover layer of an optical disc 100 had a thickness of 0.0875 nm.

3-1. First Numerical Example

The objective lens 44 of the first numerical example was designed as one having a focal length f of 1.41 mm, a glass material's refractive index n of 1.52, and a lens's thickness d of 1.80 mm as listed as specification data in Table 6.

TABLE 6

Table 6: Specification data of first numerical example $ASP(R) = (R^2/RDY)/(1 + (1 - (1 + K)(R/RDY)^2)^{1/2})) + AR^4 + BR^6 + CR^8 + DR^{10} + ER^{12} + FR^{14} + GR^{16} + HR^{18} + JR^{20}$

| | | |
|---|---|---|
| Refraction index n | | 1.52 |
| Thickness d [mm] | | 1.80 |
| Focal length f [mm] | | 1.41 |
| | Lens surface on light side | Lens surface on disc side |
| RDY | 0.921156 | −1.227045 |
| K | −0.963135 | −28.567065 |
| A | 0.080550 | 0.173252 |
| B | −0.037584 | 0.055571 |
| C | 0.387201 | −0.882878 |
| D | −1.355226 | 0.606544 |
| E | 2.806165 | 1.085021 |
| F | −3.461034 | −0.825226 |
| G | 2.513030 | −1.869125 |
| H | −0.984962 | 2.601629 |
| J | 0.158763 | −0.928283 |
| TSA3 [λrms/μm] | | −0.014 |
| fc | | 1.15 |
| On-axis wavefront aberration [λrms] | | 0.004 |
| Off-axis wavefront aberration (0.3°) [λrms] | | 0.010 |

Figure 15A:
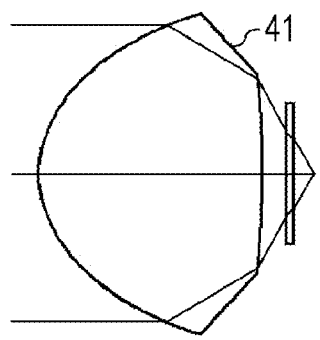
FIG. 15 is a schematic diagram illustrating the configuration and characteristic of an objective lens of a third numerical example.
Figure 15B:
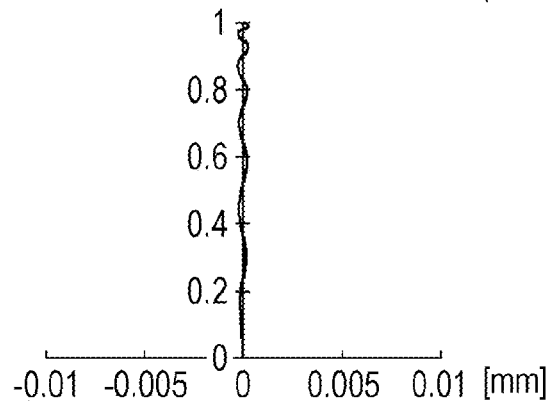

Each surface shape of the objective lens 41 was an aspherical surface represented by application of each coefficient listed in Table 6 to a distance ASP (R) shown in the equation (5). In addition, the objective lens 41 was formed in the shape of one shown in FIG. 15A. A longitudinal aberration diagram shown in FIG. 15B was obtained.

Figure 15C:
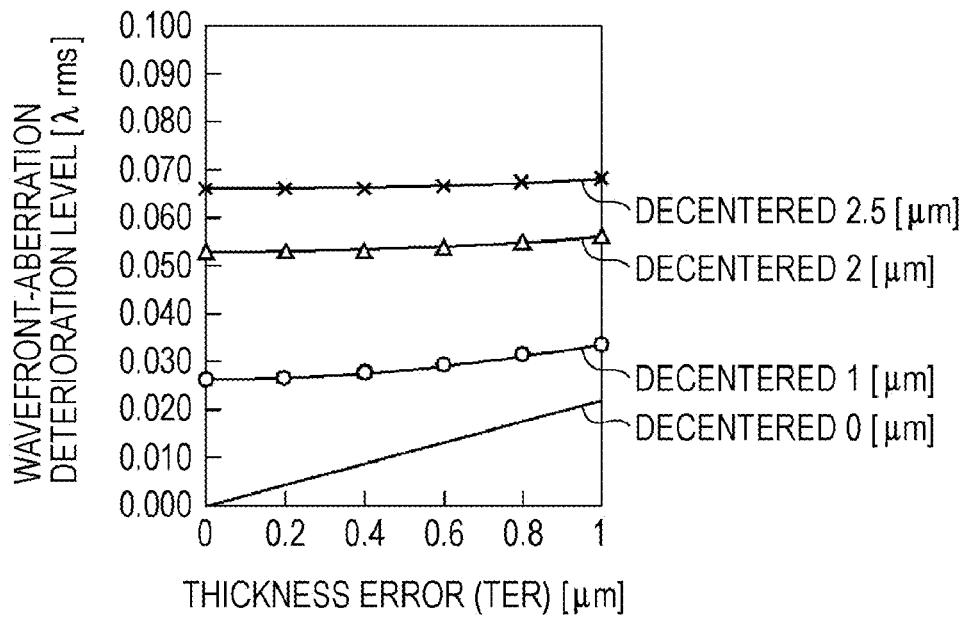

The objective lens 41 has a third-order thickness sensitivity TSA3 of −0.014 λrms/μm and satisfies the equation (13). As shown in FIG. 15C, therefore, the objective lens 41 has a wavefront aberration deterioration level TOR of 0.070 λrms or less on a constant basis as long as the thickness error TER is in the range of 0 to 1 μm and the decentering error DER is in the range of 0 to 2.5 μm.

In other words, the objective lens 41 can obtain desired optical characteristics without fail because of constantly satisfying the Marechel Criterion value as long as the decentering tolerance is 2.5 μm or less and the thickness tolerance is 1.0 μm or less at the time of production.

3-2. Second Numeral Example

The objective lens 42 of the second numerical example was designed as one having a focal length f of 1.41 mm, a glass material's refractive index n of 1.52, and a lens's thickness d of 1.80 mm as listed as specification data in Table 7.

TABLE 7

Table 7: Specification data of second numerical example $ASP(R) = (R^2/RDY)/(1 + (1 - (1 + K)(R/RDY)^2)^{1/2})) + AR^4 + BR^6 + CR^8 + DR^{10} + ER^{12} + FR^{14} + GR^{16} + HR^{18} + JR^{20}$

| | | |
|---|---|---|
| Refraction index n | | 1.52 |
| Thickness d [mm] | | 1.80 |
| Focal length f [mm] | | 1.41 |
| | Lens surface on light side | Lens surface on disc side |
| RDY | 0.919119 | −1.232559 |
| K | −0.968662 | −29.017059 |
| A | 0.082487 | 0.187426 |
| B | −0.041428 | 0.035729 |
| C | 0.409860 | −0.884274 |
| D | −1.407594 | 0.713659 |
| E | 2.867139 | 1.080456 |
| F | −3.487550 | −1.562806 |
| G | 2.504154 | −0.302026 |
| H | −0.973071 | 1.266509 |
| J | 0.156063 | −0.505260 |
| TSA3 [λrms/μm] | | −0.010 |
| fc | | 1.14 |
| On-axis wavefront aberration [λrms] | | 0.005 |
| Off-axis wavefront aberration (0.3°) [λrms] | | 0.011 |

Figure 16A:
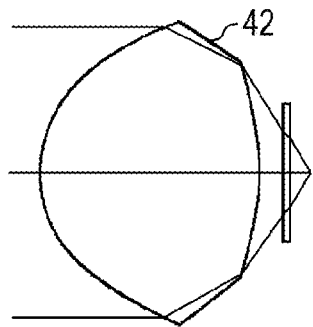
FIG. 16 is a schematic diagram illustrating the configuration and characteristic of an objective lens of a third numerical example.
Figure 16B:
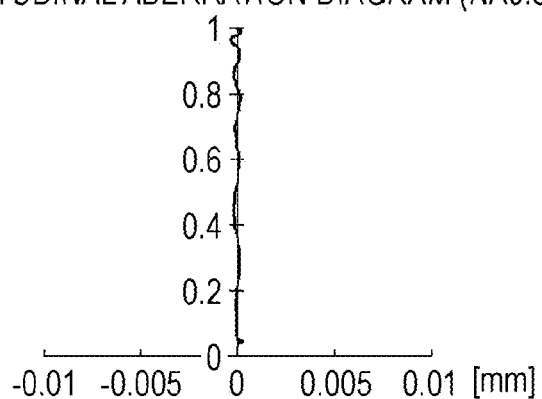

Each surface shape of the objective lens 42 was an aspherical surface represented by application of each coefficient listed in Table 7 to a distance ASP (R) shown in the equation (5). In addition, the objective lens 42 was formed in the shape of one shown in FIG. 16A. A longitudinal aberration diagram shown in FIG. 16B was obtained.

Figure 16C:
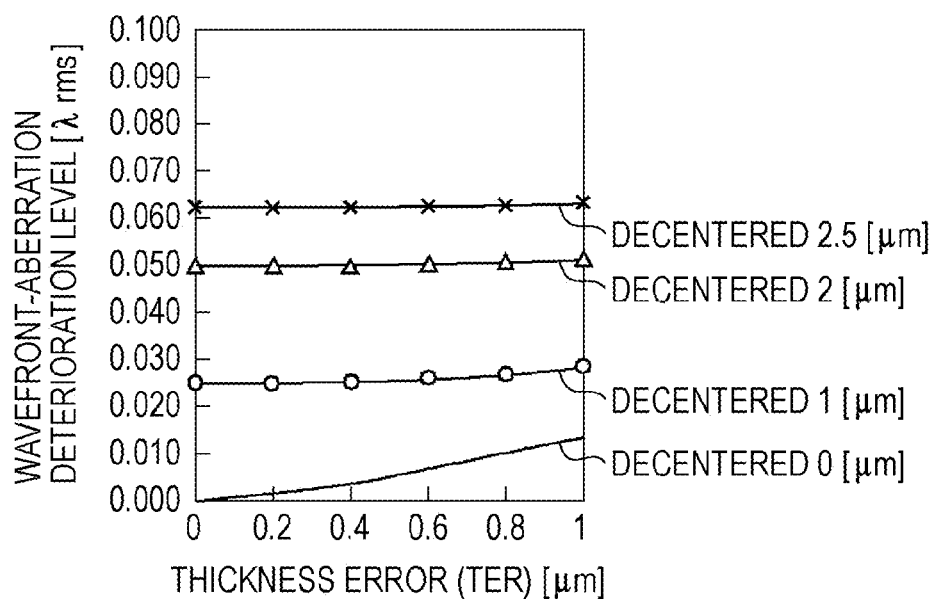

The objective lens 42 has a third-order thickness sensitivity TSA3 of −0.010 λrms/μm and satisfies the equation (13). As shown in FIG. 16C, therefore, the objective lens 42 has a wavefront aberration deterioration level TOR of 0.070 λrms or less on a constant basis as long as the thickness error TER is in the range of 0 to 1 μm and the decentering error DER is in the range of 0 to 2.5 μm.

In other words, the objective lens 42 can obtain desired optical characteristics without fail because of constantly satisfying the Marechel Criterion value as long as the decentering tolerance is 2.5 μm or less and the thickness tolerance is 1.0 μm or less at the time of production.

In particular, the objective lens 42 satisfies not only the equation (13) but also the equations (14) and (15). In other words, as is evident from FIG. 16C, the objective lens 42 has a wavefront aberration deterioration level TOR of much less than the Marechel Criterion value on a constant basis as long as the thickness error TER is in the range of 0 to 1 μm and the decentering error DER is in the range of 0 to 2.5 μm. Therefore, the objective lens 42 is designed so that it can easily exert desired optical characteristics when the thickness error TER and the decentering error DER are changed, or so that it can be extremely strong to the production error.

3-3. Third Numerical Example

The objective lens 43 of the first numerical example was designed as one having a focal length f of 1.41 mm, a glass material's refractive index n of 1.52, and a lens's thickness d of 1.80 mm as listed as specification data in Table 8.

TABLE 8

Table 8: Specification data of third numerical example $ASP(R) = (R^2/RDY)/(1 + (1 - (1 + K)(R/RDY)^2)^{1/2})) + AR^4 + BR^6 + CR^8 + DR^{10} + ER^{12} + FR^{14} + GR^{16} + HR^{18} + JR^{20}$

| | | |
|---|---|---|
| Refraction index n | | 1.52 |
| Thickness d [mm] | | 1.80 |
| Focal length f [mm] | | 1.41 |
| | Lens surface on light side | Lens surface on disc side |
| RDY | 0.923053 | −1.222017 |
| K | −0.958600 | −32.768489 |
| A | 0.083354 | 0.166773 |
| B | −0.044619 | −0.007508 |
| C | 0.415662 | −0.486556 |
| D | −1.416309 | 0.198429 |
| E | 2.871820 | 0.570568 |
| F | −3.482948 | −0.024346 |
| G | 2.495686 | −0.778048 |
| H | −0.969063 | 0.251490 |
| J | 0.155940 | 0.161198 |
| TSA3 [λrms/μm] | | −0.004 |
| fc | | 1.15 |
| On-axis wavefront aberration [λrms] | | 0.005 |
| Off-axis wavefront aberration (0.3°) [λrms] | | 0.010 |

Figure 17A:
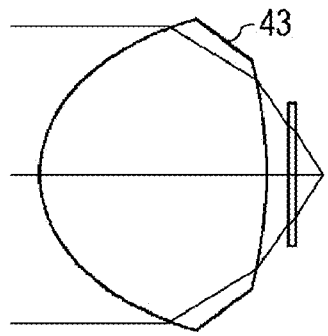
FIG. 17 is a schematic diagram illustrating the configuration and characteristic of an objective lens of a third numerical example.
Figure 17B:
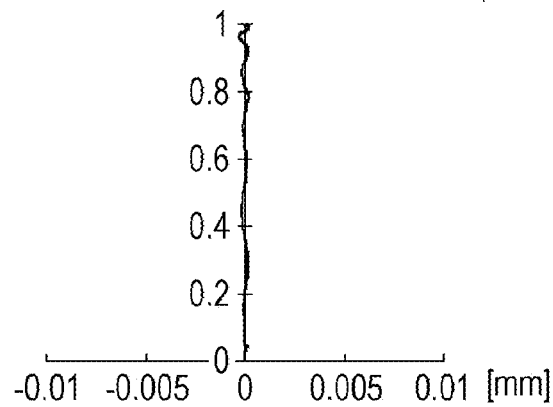

Each surface shape of the objective lens 43 was an aspherical surface represented by application of each coefficient listed in Table 8 to a distance ASP (R) shown in the equation (5). In addition, the objective lens 43 was formed in the shape of one shown in FIG. 17A. A longitudinal aberration diagram shown in FIG. 17B was obtained 17A.

Figure 17C:
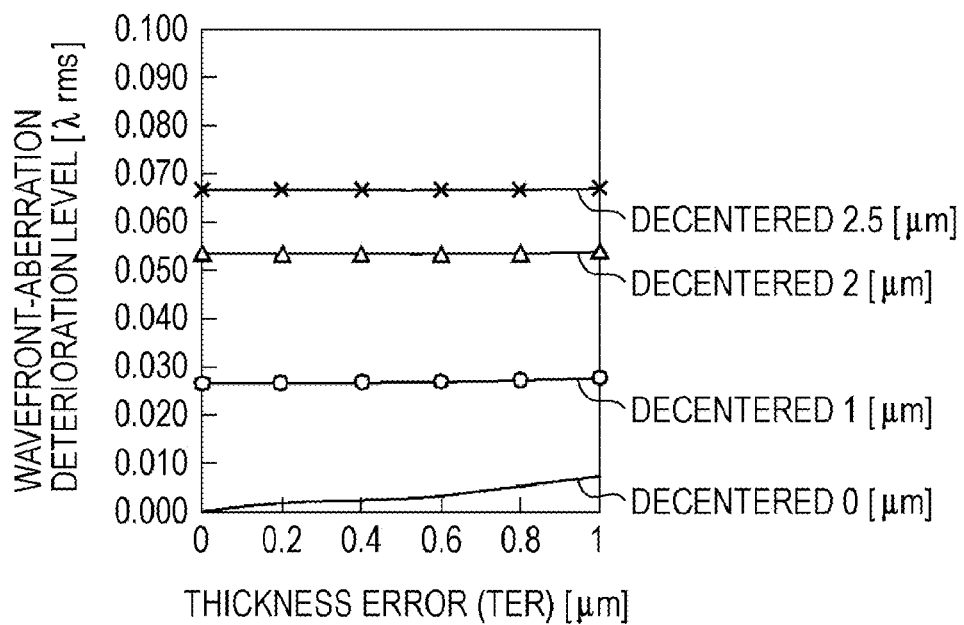

The objective lens 43 has a third-order thickness sensitivity TSA3 of −0.005 λrms/μm and satisfies the equation (13). As shown in FIG. 17C, therefore, the objective lens 43 has a wavefront aberration deterioration level TOR of 0.070 λrms or less on a constant basis as long as the thickness error TER is in the range of 0 to 1 μm and the decentering error DER is in the range of 0 to 2.5 μm.

In other words, the objective lens 43 can obtain desired optical characteristics without fail because of constantly satisfying the Marechel Criterion value as long as the decentering tolerance is 2.5 μm or less and the thickness tolerance is 1.0 μm or less at the time of production.

3-4. Fourth Numeral Example

The objective lens 44 of the fourth numerical example was designed as one having a focal length f of 1.41 mm, a glass material's refractive index n of 1.70 mm, and a lens's thickness d of 1.80 mm as listed as specification data in Table 9.

TABLE 9

Table 9: Specification data of fourth numerical example $ASP(R) = (R^2/RDY)/(1 + (1 - (1 + K)(R/RDY)^2)^{1/2})) + AR^4 + BR^6 + CR^8 + DR^{10} + ER^{12} + FR^{14} + GR^{16} + HR^{18} + JR^{20}$

| | | |
|---|---|---|
| Refraction index n | | 1.70 |
| Thickness d [mm] | | 1.80 |
| Focal length f [mm] | | 1.41 |
| | Lens surface on light side | Lens surface on disc side |
| RDY | 1.067194 | −4.075145 |
| K | −0.509030 | −191.198157 |
| A | 0.007277 | 0.422681 |
| B | 0.028726 | −0.949912 |
| C | −0.157648 | −0.809150 |
| D | 0.510415 | 7.675457 |
| E | −0.941532 | −14.981587 |
| F | 1.040963 | 11.231709 |
| G | −0.683721 | −0.479647 |
| H | 0.246056 | −1.610634 |
| J | −0.037753 | −0.838633 |
| TSA3 [λrms/μm] | | −0.009 |
| fc | | 1.16 |
| On-axis wavefront aberration [λrms] | | 0.004 |
| Off-axis wavefront aberration (0.3°) [λrms] | | 0.007 |

Figure 18A:
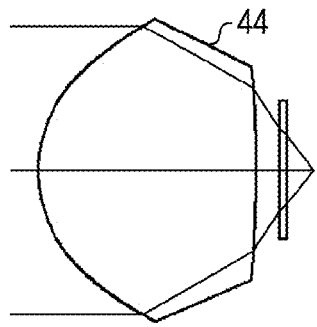
FIG. 18 is a schematic diagram illustrating the configuration and characteristic of an objective lens of a fourth numerical example.
Figure 18B:
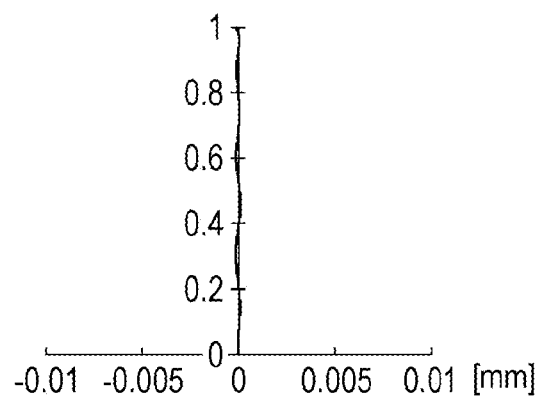

Each surface shape of the objective lens 44 was an aspherical surface represented by application of each coefficient listed in Table 9 to a distance ASP (R) shown in the equation (5). In addition, the objective lens 44 was formed in the shape of one shown in FIG. 18A. A longitudinal aberration diagram shown in FIG. 18B was obtained.

Figure 18C:
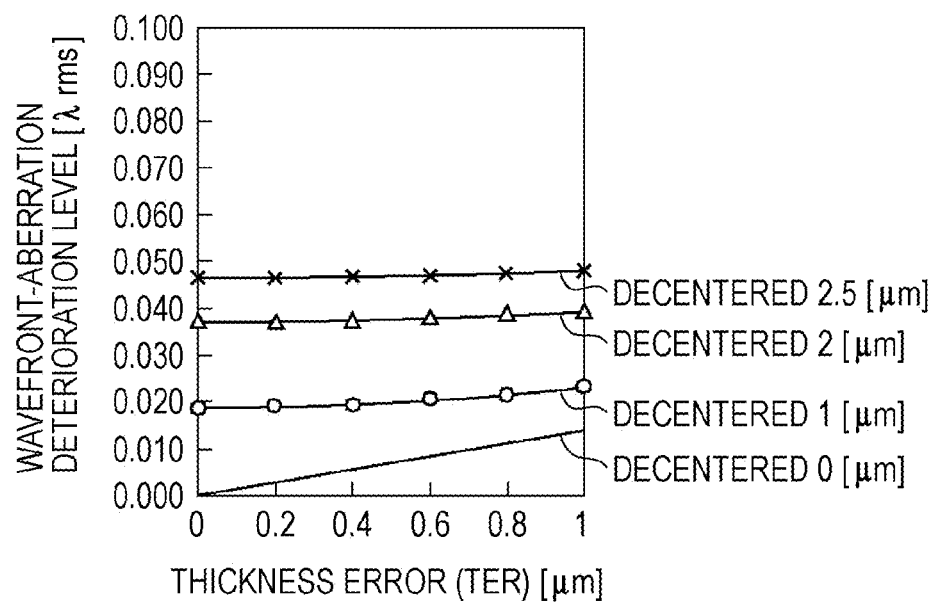

The objective lens 44 has a third-order thickness sensitivity TSA3 of −0.010 λrms/μm and satisfies the equation (12). As shown in FIG. 18C, therefore, the objective lens 44 has a wavefront aberration deterioration level TOR of 0.070 λrms or less on a constant basis as long as the thickness error TER is in the range of 0 to 1 μm and the decentering error DER is in the range of 0 to 2.5 μm.

In other words, the objective lens 44 can obtain desired optical characteristics without fail because of constantly satisfying the Marechel Criterion value as long as the decentering tolerance is 2.5 μm or less and the thickness tolerance is 1.0 μm or less at the time of production.

In particular, the objective lens 44 satisfies not only the equation (13) but also the equations (14) and (15) just as in the case with the objective lens 42 of the second numeral example. In other words, as is evident from FIG. 18C, the objective lens 44 has a wavefront aberration deterioration level TOR of much less than 0.05 λrms on a constant basis as long as the thickness error TER is in the range of 0 to 1 μm and the decentering error DER is in the range of 0 to 2.5 μm. Therefore, the objective lens 44 is designed so that it can easily exert desired optical characteristics when the thickness error TER and the decentering error DER are changed, or so that it can be extremely strong to the production error.

3-5. Fifth Numeral Example

The objective lens 45 of the fifth numerical example was designed as one having a focal length f of 1.41 mm, a glass material's refractive index n of 1.52, and a lens's thickness d of 1.60 mm as listed as specification data in Table 10.

TABLE 10

Table 10: Specification data of fifth numerical example

ASP(R) = (R$^2$/RDY)/(1 + (1 − (1 + K)(R/RDY)$^2$)$^{1/2}$)) + AR$^4$ + BR$^6$ + CR$^8$ + DR$^{10}$ + ER$^{12}$ + FR$^{14}$ + GR$^{16}$ + HR$^{18}$ + JR$^{20}$

| Refraction index n | 1.52 |
| --- | --- |
| Thickness d [mm] | 1.60 |
| Focal length f [mm] | 1.41 |

| | Lens surface on light side | Lens surface on disc side |
| --- | --- | --- |
| RDY | 0.895805 | −1.629336 |
| K | −0.570530 | −12.956040 |
| A | 0.003400 | 0.459687 |
| B | 0.047281 | −0.403272 |
| C | −0.196824 | −2.459397 |
| D | 0.550370 | 9.016114 |
| E | −0.889774 | −13.792267 |
| F | 0.910513 | 10.211329 |
| G | −0.585332 | −2.170838 |
| H | 0.211423 | −1.497164 |
| J | −0.033254 | 0.723091 |
| TSA3 [λrms/μm] | | −0.010 |
| fc | | 1.12 |
| On-axis wavefront aberration [λrms] | | 0.006 |
| Off-axis wavefront aberration (0.3°) [λrms] | | 0.026 |

TABLE 11

Table 11: Specification data of sixth numerical example

ASP(R) = (R$^2$/RDY)/(1 + (1 − (1 + K)(R/RDY)$^2$)$^{1/2}$)) + AR$^4$ + BR$^6$ + CR$^8$ + DR$^{10}$ + ER$^{12}$ + FR$^{14}$ + GR$^{16}$ + HR$^{18}$ + JR$^{20}$

| Refraction index n | 1.52 |
| --- | --- |
| Thickness d [mm] | 1.28 |
| Focal length f [mm] | 1.00 |

| | Lens surface on light side | Lens surface on disc side |
| --- | --- | --- |
| RDY | 0.654037 | −0.864077 |
| K | −0.569720 | −20.447603 |
| A | 0.021332 | 1.022855 |
| B | 0.227198 | −2.037434 |
| C | −2.069096 | −24.178421 |
| D | 11.805739 | 189.871399 |
| E | −39.423383 | −619.871701 |
| F | 81.582451 | 964.762765 |
| G | −102.713425 | −364.555798 |
| H | 72.240077 | −805.056272 |
| J | −22.555750 | 769.549056 |
| TSA3 [λrms/μm] | | −0.009 |
| fc | | 1.15 |
| On-axis wavefront aberration [λrms] | | 0.002 |
| Off-axis wavefront aberration (0.3°) [λrms] | | 0.009 |

Figure 19A:
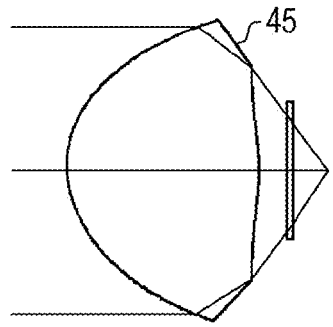
FIG. 19 is a schematic diagram illustrating the configuration and characteristic of an objective lens of a fifth numerical example.
Figure 19B:
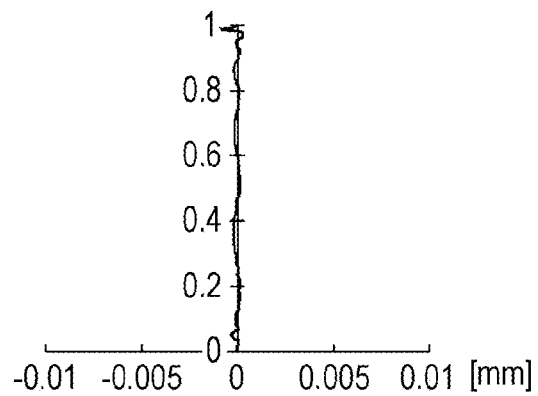

Each surface shape of the objective lens 45 was an aspherical surface represented by application of each coefficient listed in Table 10 to a distance ASP (R) shown in the equation (5). In addition, the objective lens 45 was formed in the shape of one shown in FIG. 19A. A longitudinal aberration diagram shown in FIG. 19B was obtained.

Figure 19C:
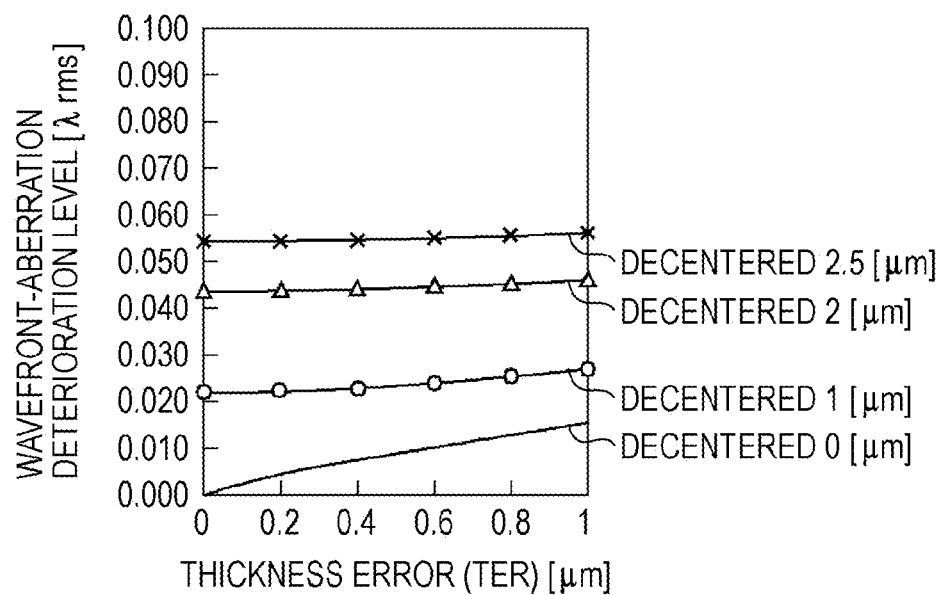

The objective lens 45 has a third-order thickness sensitivity TSA3 of −0.010 λrms/μm and satisfies the equation (13). As shown in FIG. 19C, therefore, the objective lens 45 has a wavefront aberration deterioration level TOR of 0.070 λrms or less on a constant basis as long as the thickness error TER is in the range of 0 to 1 μm and the decentering error DER is in the range of 0 to 2.5 μm.

In other words, the objective lens 45 can obtain desired optical characteristics without fail because of constantly satisfying the Marechel Criterion value as long as the decentering tolerance is 2.5 μm or less and the thickness tolerance is 1.0 μm or less at the time of production.

In particular, the objective lens 45 satisfies not only the equation (13) but also the equations (14) and (15) just as in the case with the objective lens 44 of the second numeral example. In other words, as is evident from FIG. 19C, the objective lens 44 has a wavefront aberration deterioration level TOR of less than 0.06 λrms on a constant basis as long as the thickness error TER is in the range of 0 to 1 μm and the decentering error DER is in the range of 0 to 2.5 μm. Therefore, the objective lens 45 is designed so that it can easily exert desired optical characteristics when the thickness error TER and the decentering error DER are changed, or so that it can be extremely strong to the production error.

3-6. Sixth Numerical Example

The objective lens 46 of the sixth numerical example was designed as one having a focal length f of 1.00 mm, a glass material's refractive index n of 1.52, and a lens's thickness d of 1.28 mm as listed as specification data in Table 11.

Figure 20A:
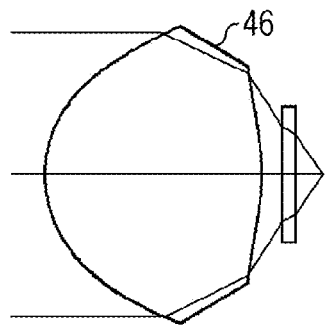
FIG. 20 is a schematic diagram illustrating the configuration and characteristic of an objective lens of a sixth numerical example.
Figure 20B:
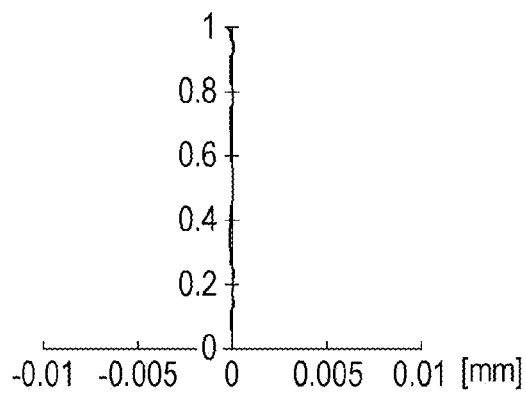

Each surface shape of the objective lens 46 was an aspherical surface represented by application of each coefficient listed in Table 11 to a distance ASP (R) shown in the equation (5). In addition, the objective lens 46 was formed in the shape of one shown in FIG. 20A. A longitudinal aberration diagram shown in FIG. 20B was obtained.

Figure 20C:
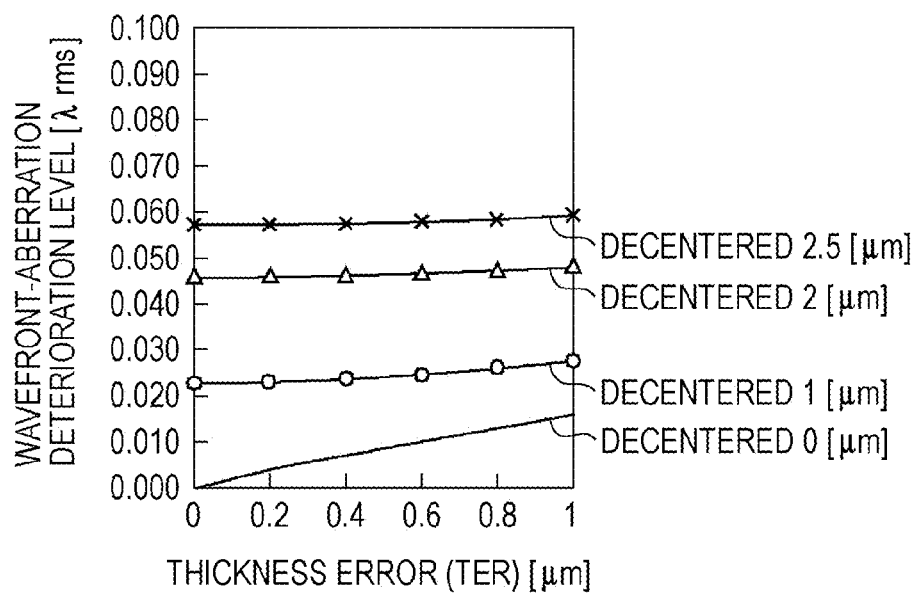

The objective lens 46 has a third-order thickness sensitivity TSA3 of −0.009 λrms/μm and satisfies the equation (13). As shown in FIG. 20C, therefore, the objective lens 46 has a wavefront aberration deterioration level TOR of 0.070 λrms or less on a constant basis as long as the thickness error TER is in the range of 0 to 1 μm and the decentering error DER is in the range of 0 to 2.5 μm.

In other words, the objective lens 46 can obtain desired optical characteristics without fail because of constantly satisfying the Marechel Criterion value as long as the decentering tolerance is 2.5 μm or less and the thickness tolerance is 1.0 μm or less at the time of production.

In particular, the objective lens 46 satisfies not only the equation (13) but also the equations (14) and (15) just as in the case with the objective lens 45 of the fifth numeral example. In other words, as is evident from FIG. 20C, the objective lens 46 has a wavefront aberration deterioration level TOR of much less than 0.06 λrms on a constant basis as long as the thickness error TER is in the range of 0 to 1 μm and the decentering error DER is in the range of 0 to 2.5 μm. Therefore, the objective lens 46 is designed so that it can easily exert desired optical characteristics when the thickness error TER and the decentering error DER are changed, or so that it can be extremely strong to the production error.

3-7. Second Numeral Example

The objective lens 47 of the seventh numeral example was designed as one having a focal length f of 1.41 mm, a glass material's refractive index n of 1.52, and a lens's thickness d of 1.93 mm as listed as specification data in Table 12.

TABLE 12

Table 12: Specification data of 7th numerical value example $$ASP(R) = (R^2/RDY)/(1 + (1 - (1 + K)(R/RDY)^2)^{1/2})) + AR^4 + BR^6 + CR^8 + DR^{10} + ER^{12} + FR^{14} + GR^{16} + HR^{18} + JR^{20}$$
$$HOE(R) = C1R^2 + C2R^4 + C3R^6 + C4R^8 + C5R^{10}$$

| | | |
|---|---|---|
| Refraction index n | | 1.52 |
| Thickness d [mm] | | 1.93 |
| Focal length f [mm] | | 1.41 |

| | Lens surface on light side | Lens surface on disc side |
|---|---|---|
| RDY | 0.916503 | −1.015726 |
| K | −0.663372 | −34.291606 |
| A | 0.010720 | 0.229773 |
| B | 0.020832 | −0.219925 |
| C | −0.024138 | −0.913536 |
| D | 0.015783 | 2.426549 |
| E | −0.004091 | −2.616847 |
| F | −0.003318 | 1.405410 |
| G | −0.003073 | −0.262083 |
| H | 0.008027 | −0.003414 |
| J | −0.003918 | −0.143255 |
| C1 | 0.007097 | |
| C2 | −0.012133 | |
| C3 | 0.008730 | |
| C4 | −0.011286 | |
| C5 | 0.002330 | |
| TSA3 [λrms/μm] | | −0.009 |
| On-axis wavefront aberration [λrms] | | 0.003 |
| Off-axis wavefront aberration (0.3°) [λrms] | | 0.008 |

Figure 21A:
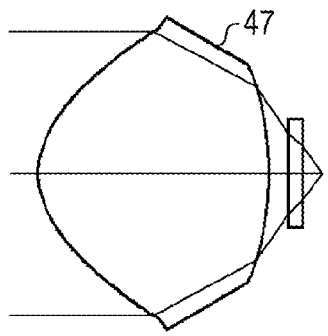
FIG. 21 is a schematic diagram illustrating the configuration and characteristic of an objective lens of a seventh numerical example.
Figure 21B:
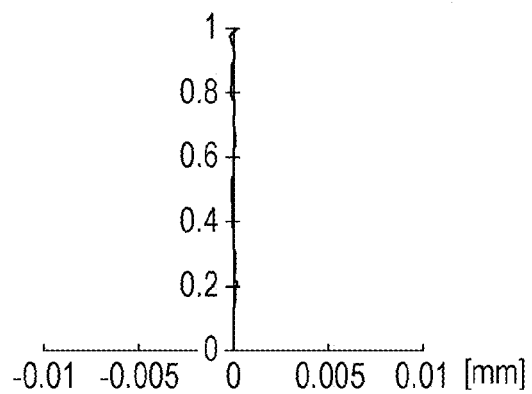

Each surface shape of the objective lens 47 was an aspherical surface represented by application of each coefficient listed in Table 12 to a distance ASP (R) shown in the equation (5). In addition, the objective lens 47 was formed in the shape of one shown in FIG. 21A. A longitudinal aberration diagram shown in FIG. 21B was obtained.

Figure 21C:
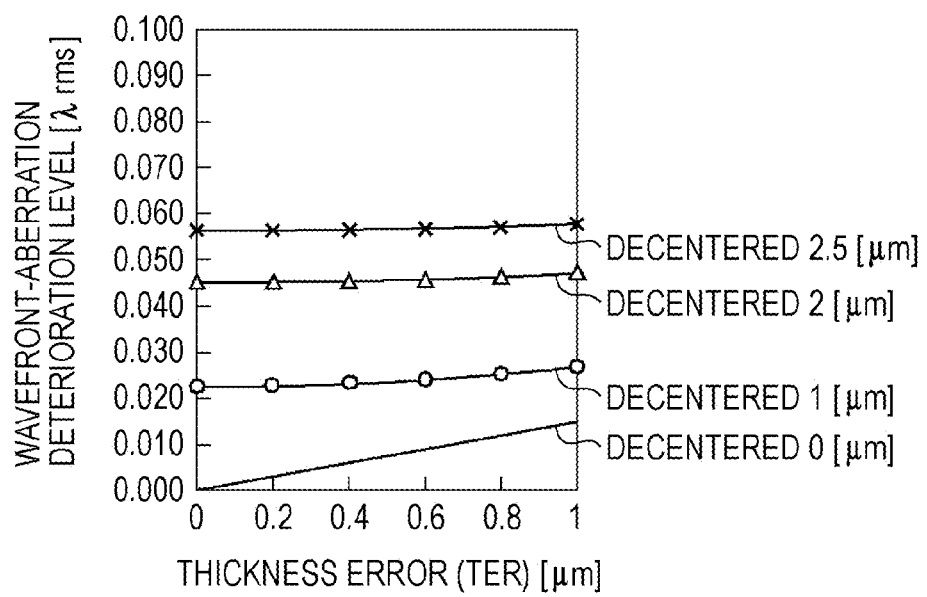

The objective lens 47 has a third-order thickness sensitivity TSA3 of −0.009 λrms/μm and satisfies the equation (13). As shown in FIG. 21C, therefore, the objective lens 47 has a wavefront aberration deterioration level TOR of 0.070 λrms or less on a constant basis as long as the thickness error TER is in the range of 0 to 1 μm and the decentering error DER is in the range of 0 to 2.5 μm.

In other words, the objective lens 47 can obtain desired optical characteristics without fail because of constantly satisfying the Marechel Criterion value as long as the decentering tolerance is 2.5 μm or less and the thickness tolerance is 1.0 μm or less at the time of production.

In particular, the objective lens 47 satisfies not only the equation (13) but also the equations (14) and (15) just as in the case with the objective lens 46 of the sixth numeral example. In other words, as is evident from FIG. 21C, the objective lens 47 has a wavefront aberration deterioration level TOR of much less than 0.06 λrms on a constant basis as long as the thickness error TER is in the range of 0 to 1 μm and the decentering error DER is in the range of 0 to 2.5 μm. Therefore, the objective lens 47 is designed so that it can easily exert desired optical characteristics when the thickness error TER and the decentering error DER are changed, or so that it can be extremely strong to the production error.

3-8. Eighth Numerical Example

The objective lens 48 of the eighth numerical example was designed as one having a focal length f of 0.90 mm, a glass material's refractive index n of 1.50 mm, and a lens's thickness d of 1.11 mm as listed as specification data in Table 13.

TABLE 13

Table 13: Specification data of eighth numerical example $$ASP(R) = (R^2/RDY)/(1 + (1 - (1 + K)(R/RDY)^2)^{1/2})) + AR^4 + BR^6 + CR^8 + DR^{10} + ER^{12} + FR^{14} + GR^{16} + HR^{18} + JR^{20}$$

| | | |
|---|---|---|
| Refraction index n | | 1.50 |
| Thickness d [mm] | | 1.11 |
| Focal length f [mm] | | 0.90 |

| | Lens surface on light side | Lens surface on disc side |
|---|---|---|
| RDY | 0.572036 | −0.744726 |
| K | −0.505819 | −24.671659 |
| A | −0.017956 | 0.088632 |
| B | 0.770875 | 10.910550 |
| C | −10.543444 | −126.322287 |
| D | 67.540683 | 727.723562 |
| E | −245.729042 | −2538.460571 |
| F | 525.589443 | 5240.484512 |
| G | −658.475471 | −5344.725497 |
| H | 462.058804 | 643.647010 |
| J | −162.226572 | 2241.201397 |
| TSA3 [λrms/μm] | | −0.010 |
| fc | | 1.14 |
| On-axis wavefront aberration [λrms] | | 0.008 |
| Off-axis wavefront aberration (0.3°) [λrms] | | 0.011 |

Figure 22A:
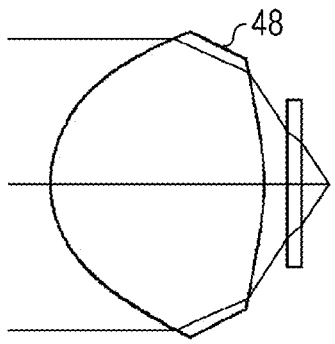
FIG. 22 is a schematic diagram illustrating the configuration and characteristic of an objective lens of an eighth numerical example.
Figure 22B:
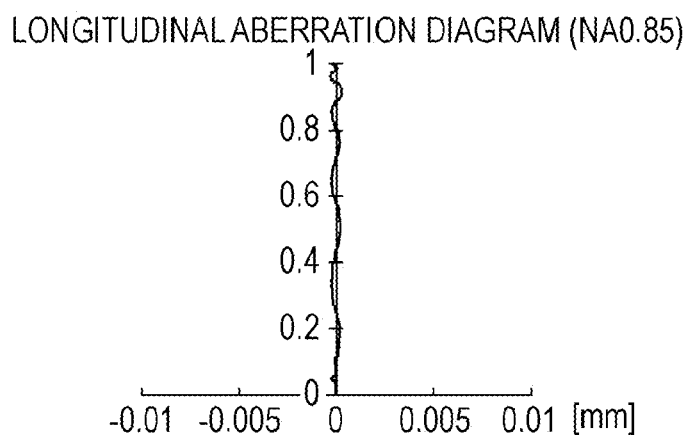

Each surface shape of the objective lens 48 was an aspherical surface represented by application of each coefficient listed in Table 13 to a distance ASP (R) shown in the equation (5). In addition, the objective lens 48 was formed in the shape of one shown in FIG. 22A. A longitudinal aberration diagram shown in FIG. 22B was obtained.

Figure 22C:
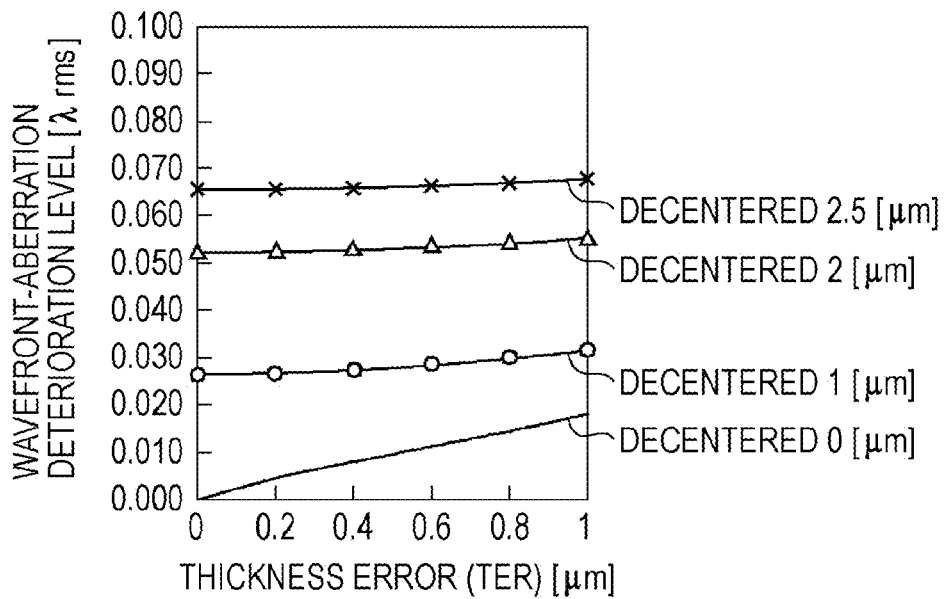

The objective lens 48 has a third-order thickness sensitivity TSA3 of −0.010 λrms/μm and satisfies the equation (13). As shown in FIG. 22C, therefore, the objective lens 48 has a wavefront aberration deterioration level TOR of 0.070 λrms or less on a constant basis as long as the thickness error TER is in the range of 0 to 1 μm and the decentering error DER is in the range of 0 to 2.5 μm.

In other words, the objective lens 48 can obtain desired optical characteristics without fail because of constantly satisfying the Marechel Criterion value as long as the decentering tolerance is 2.5 μm or less and the thickness tolerance is 1.0 μm or less at the time of production.

3-9. Second Numeral Example

The objective lens 49 of the ninth numerical example was designed as one having a focal length f of 0.90 mm, a glass material's refractive index n of 1.70, and a lens's thickness d of 1.09 mm as listed as specification data in Table 14.

TABLE 14

Table 14: Specification data of ninth numerical example $$ASP(R) = (R^2/RDY)/(1 + (1 - (1 + K)(R/RDY)^2)^{1/2})) + AR^4 + BR^6 + CR^8 + DR^{10} + ER^{12} + FR^{14} + GR^{16} + HR^{18} + JR^{20}$$

| | |
|---|---|
| Refraction index n | 1.70 |
| Thickness d [mm] | 1.09 |
| Focal length f [mm] | 0.90 |

TABLE 14-continued

Table 14: Specification data of ninth numerical example

|     | Lens surface on light side | Lens surface on disc side |
| --- | --- | --- |
| RDY | 0.678308 | −2.981366 |
| K | −0.399164 | −566.738853 |
| A | −0.032461 | 0.283821 |
| B | 0.846107 | 8.965234 |
| C | −10.672617 | −123.986965 |
| D | 66.859662 | 728.697249 |
| E | −242.845135 | −2519.861850 |
| F | 526.077936 | 5268.884368 |
| G | −688.081583 | −5213.502377 |
| H | 455.254730 | −1939.139247 |
| J | −130.609905 | 7083.243531 |
| TSA3 [λrms/μm] | | −0.009 |
| fc | | 1.15 |
| On-axis wavefront aberration [λrms] | | 0.007 |
| Off-axis wavefront aberration (0.3°) [λrms] | | 0.008 |

Figure 23A:
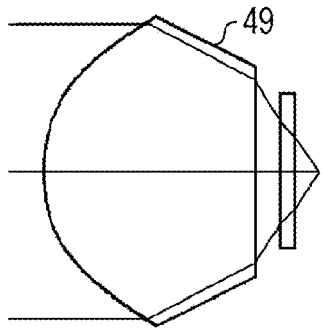
FIG. 23 is a schematic diagram illustrating the configuration and characteristic of an objective lens of a ninth numerical example.
Figure 23B:
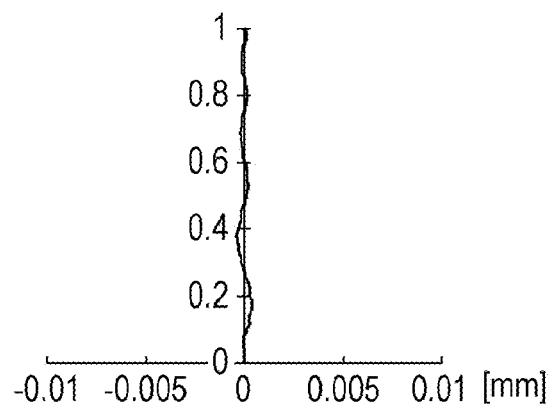

Each surface shape of the objective lens 49 was an aspherical surface represented by application of each coefficient listed in Table 14 to a distance ASP (R) shown in the equation (5). In addition, the objective lens 49 was formed in the shape of one shown in FIG. 23A. A longitudinal aberration diagram shown in FIG. 23B was obtained.

Figure 23C:
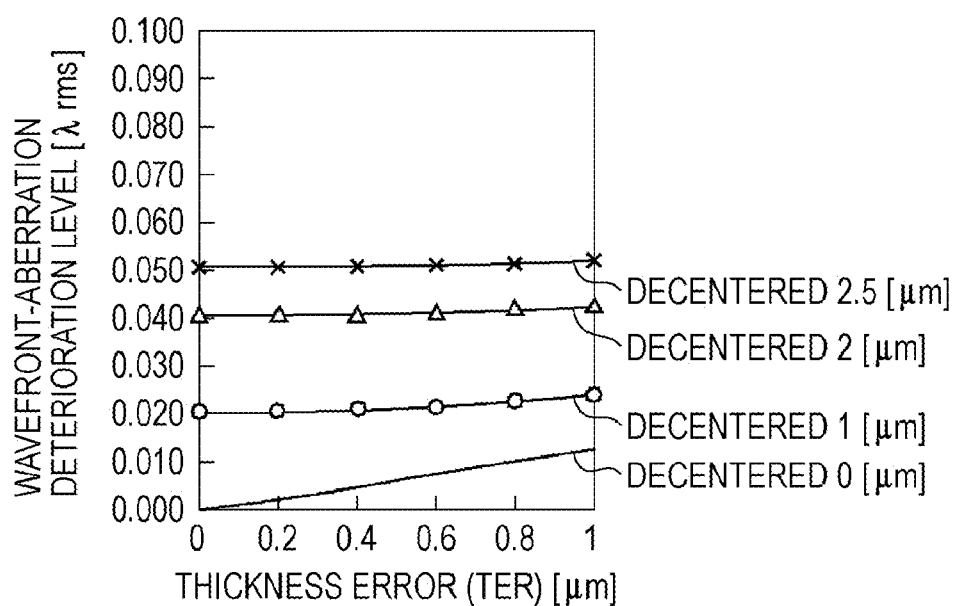

The objective lens 49 has a third-order thickness sensitivity TSA3 of −0.009 λrms/μm and satisfies the equation (13). As shown in FIG. 23C, therefore, the objective lens 49 has a wavefront aberration deterioration level TOR of 0.070 λrms or less on a constant basis as long as the thickness error TER is in the range of 0 to 1 μm and the decentering error DER is in the range of 0 to 2.5 μm.

In other words, the objective lens 49 can obtain desired optical characteristics without fail because of constantly satisfying the Marechel Criterion value as long as the decentering tolerance is 2.5 μm or less and the thickness tolerance is 1.0 μm or less at the time of production.

3-10. Tenth Numerical Example

The objective lens 50 of the tenth numerical example was designed as one having a focal length f of 2.20 mm, a glass material's refractive index n of 1.50, and a lens's thickness d of 2.82 mm as listed as specification data in Table 15.

TABLE 15

Table 15: Specification data of tenth numerical example

ASP(R) = (R$^2$/RDY)/(1 + (1 − (1 + K)(R/RDY)$^2$)$^{1/2}$)) + AR$^4$ + BR$^6$ + CR$^8$ + DR$^{10}$ + ER$^{12}$ + FR$^{14}$ + GR$^{16}$ + HR$^{18}$ + JR$^{20}$

| Refraction index n | 1.50 |
| --- | --- |
| Thickness d [mm] | 2.82 |
| Focal length f [mm] | 2.20 |

|     | Lens surface on light side | Lens surface on disc side |
| --- | --- | --- |
| RDY | 1.390686 | −1.700342 |
| K | −0.531080 | −23.321387 |
| A | 0.000633 | 0.053103 |
| B | 0.003562 | 0.026984 |
| C | −0.007605 | −0.134092 |
| D | 0.008315 | 0.159480 |
| E | −0.005739 | −0.101928 |
| F | 0.002645 | 0.033861 |
| G | −0.000807 | −0.003062 |

TABLE 15-continued

Table 15: Specification data of tenth numerical example

| H | 0.000148 | −0.001259 |
| --- | --- | --- |
| J | −0.000012 | 0.000279 |
| TSA3 [λrms/μm] | | −0.010 |
| fc | | 1.14 |
| On-axis wavefront aberration [λrms] | | 0.007 |
| Off-axis wavefront aberration (0.3°) [λrms] | | 0.013 |

Figure 24A:
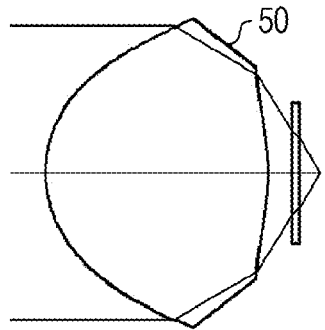
FIG. 24 is a schematic diagram illustrating the configuration and characteristic of an objective lens of a tenth numerical example.
Figure 24B:
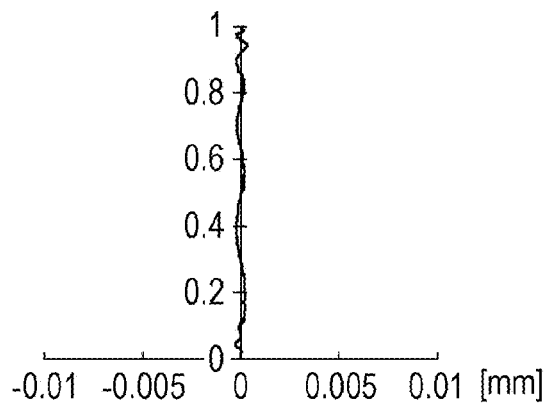

Each surface shape of the objective lens 50 was an aspherical surface represented by application of each coefficient listed in Table 15 to a distance ASP (R) shown in the equation (5). In addition, the objective lens 50 was formed in the shape of one shown in FIG. 24A. A longitudinal aberration diagram shown in FIG. 24B was obtained.

Figure 24C:
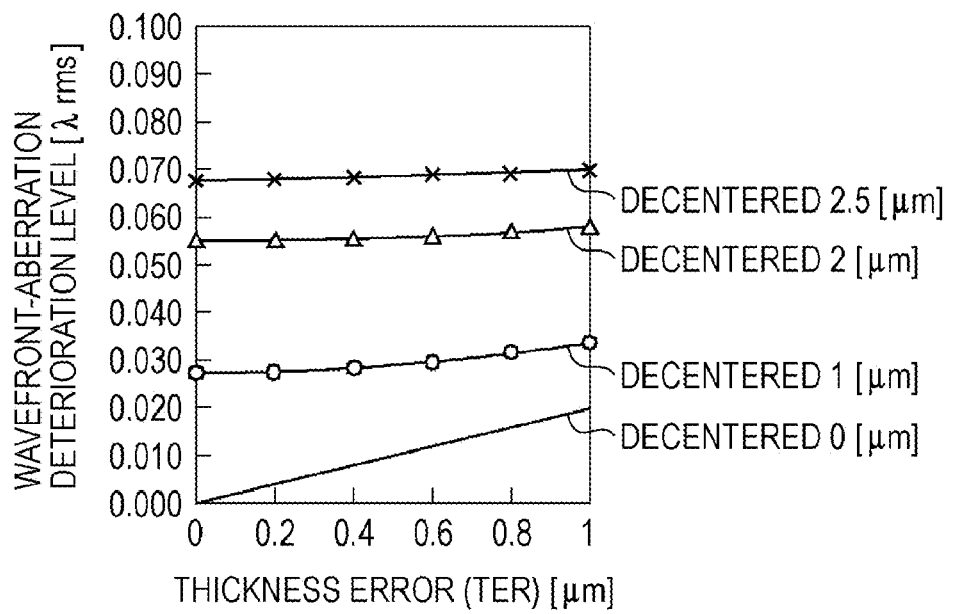

The objective lens 50 has a third-order thickness sensitivity TSA3 of −0.010 λrms/μm and satisfies the equation (13). As shown in FIG. 24C, therefore, the objective lens 50 has a wavefront aberration deterioration level TOR of 0.070 λrms or less on a constant basis as long as the thickness error TER is in the range of 0 to 1 μm and the decentering error DER is in the range of 0 to 2.5 μm.

In other words, the objective lens 50 can obtain desired optical characteristics without fail because of constantly satisfying the Marechel Criterion value as long as the decentering tolerance is 2.5 μm or less and the thickness tolerance is 1.0 μm or less at the time of production.

3-11. Eleventh Numerical Example

The objective lens 51 of the eleventh numerical example was designed as one having a focal length f of 2.20 mm, a glass material's refractive index n of 1.70 mm, and a lens's thickness d of 2.82 mm as listed as specification data in Table 11.

TABLE 16

Table 16: Specification data of eleventh numerical example

ASP(R) = (R$^2$/RDY)/(1 + (1 − (1 + K)(R/RDY)$^2$)$^{1/2}$)) + AR$^4$ + BR$^6$ + CR$^8$ + DR$^{10}$ + ER$^{12}$ + FR$^{14}$ + GR$^{16}$ + HR$^{18}$ + JR$^{20}$

| Refraction index n | 1.70 |
| --- | --- |
| Thickness d [mm] | 2.82 |
| Focal length f [mm] | 2.20 |

|     | Lens surface on light side | Lens surface on disc side |
| --- | --- | --- |
| RDY | 1.655588 | −6.587064 |
| K | −0.311377 | −557.206784 |
| A | −0.002913 | 0.063170 |
| B | 0.001539 | −0.005636 |
| C | −0.006176 | −0.105074 |
| D | 0.007472 | 0.137267 |
| E | −0.005723 | −0.103295 |
| F | 0.002740 | 0.049069 |
| G | −0.000819 | −0.008927 |
| H | 0.000139 | −0.002827 |
| J | −0.000011 | 0.001382 |
| TSA3 [λrms/μm] | | −0.009 |
| fc | | 1.15 |
| On-axis wavefront aberration [λrms] | | 0.004 |
| Off-axis wavefront aberration (0.3°) [λrms] | | 0.011 |

Figure 25A:
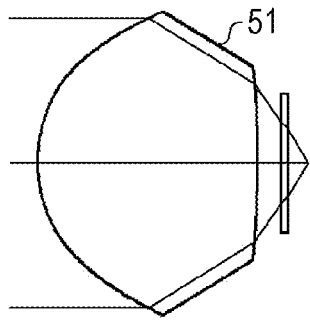
FIG. 25 is a schematic diagram illustrating the configuration and characteristic of an objective lens of an eleventh numerical example.
Figure 25B:
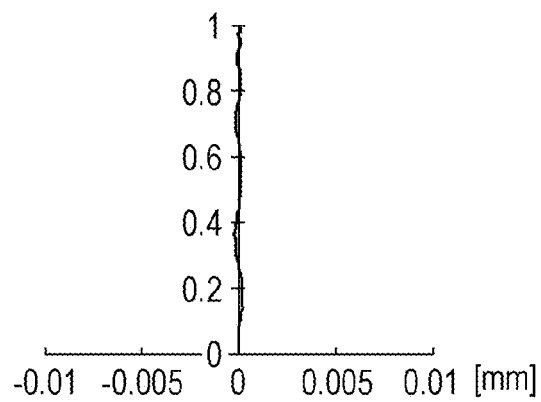

Each surface shape of the objective lens 51 was an aspherical surface represented by application of each coefficient listed in Table 16 to a distance ASP (R) shown in the equation (5). In addition, the objective lens 51 was formed in the shape of one shown in FIG. 25A. A longitudinal aberration diagram shown in FIG. 25B was obtained.

Figure 25C:
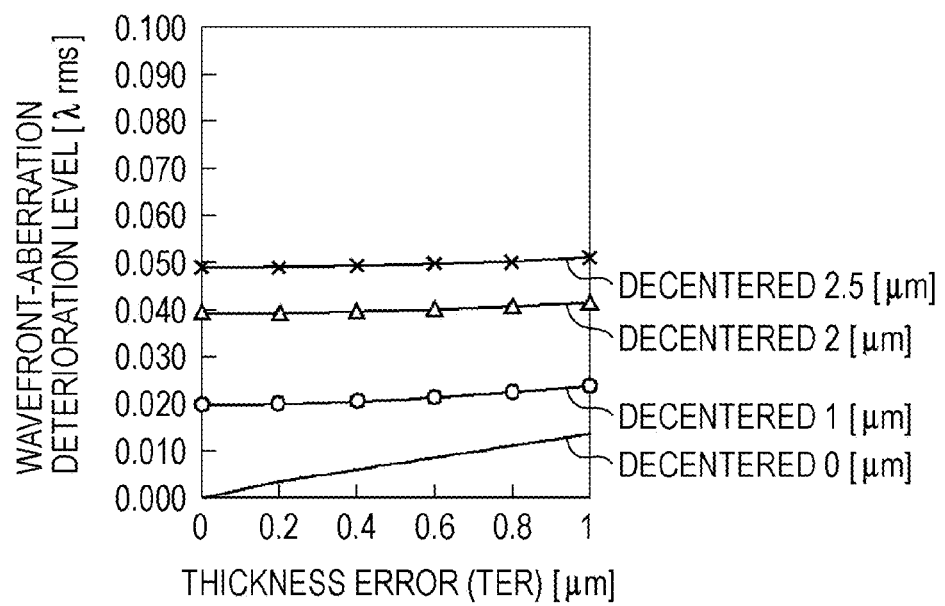

The objective lens 51 has a third-order thickness sensitivity TSA3 of −0.009 λrms/μm and satisfies the equation (13). As shown in FIG. 25C, therefore, the objective lens 51 has a wavefront aberration deterioration level TOR of 0.070 λrms or less on a constant basis as long as the thickness error TER is in the range of 0 to 1 μm and the decentering error DER is in the range of 0 to 2.5 μm.

In other words, the objective lens 51 can obtain desired optical characteristics without fail because of constantly satisfying the Marechel Criterion value as long as the decentering tolerance is 2.5 μm or less and the thickness tolerance is 1.0 μm or less at the time of production.

4. OPERATION AND EFFECTS

As described above, the objective lens 8 to be mounted on the optical pickup 7 of the optical disc apparatus 1 is designed so that the wavefront aberration deterioration level TOR satisfies the Marechel Criterion as shown in the equation (12) by adjusting the third-order thickness sensitivity TSA3 to within the range of the equation (13).

Therefore, the wavefront aberration level can be comparatively lowered as long as the decentering tolerance is 2.5 μm or less and the thickness tolerance is 1.0 μm or less. As a result, the objective lens 8 can exert desired optical characteristics.

In other words, the objective lens 8 can be designed so that the range of the third-order thickness sensitivity TSA3 is restricted within the range of the equation (13). Thus, the third-order decentering sensitivity DCm3, the fifth-order decentering sensitivity DCm5, and the fifth-order thickness sensitivity TSA5 can be values defined by the equations (6) to (8), respectively, thereby satisfying the equation (12).

In other words, in the case of the objective lens 8, the wavefront-aberration deterioration level can be lowered as long as the decentering error DER and the thickness error TER are respectively within the ranges of a decentering tolerance of 2.5 μm and a thickness tolerance of 1.0 μm.

Therefore, the objective lens 8 does not cause a problem that "as a result of adjusting one of the decentering sensitivity or the thickness sensitivity to zero, one of these sensitivities increases and the wavefront-aberration deterioration level exceeds the Marechel Criterion value even if the decentering error DER and the thickness error TER are eventually within the range of the production tolerance".

As a result, in the case of the objective lens 8, as long as the decentering error DER and the thickness error TER are within the ranges of the decentering tolerance, desired optical property can be obtained. Thus, it becomes possible to suppress the rate of incidence of inferior goods very low. As a result, the occurrence probability of inferior goods can be reduced markedly.

More specifically, the present embodiment has focused attention on the fact that decentering tolerance and thickness tolerance, which are main variable factors in production, the formation of the objective lens 8 with a multi-cavity mold. In this case, the thickness tolerance is about 1 μm and the decentering tolerance is about 2.5 μm.

The present embodiment minimizes the total level of aberration caused by the decentering tolerance and the thickness tolerance to improve the yield of the objective lens 8 in production.

With respect to the objective lens 8, the present embodiment has revealed and used the fact that there is a distinct linear trade-off relation as represented by the equations (6) to (8) in the relation between the spherical aberration deterioration level caused by the thickness tolerance and the coma aberration deterioration level caused by the decentering tolerance.

More specifically, the present embodiment has used the fact that each of the third-order decentering sensitivity DCm3, the fifth-order decentering sensitivity DCm5, and the fifth-order thickness sensitivity TSA5 can be converted into the third-order thickness sensitivity TSA3 by the linearity of the equations (6) to (8).

Therefore, the objective lens 8 can be designed by adjusting the wavefront aberration level within a desired range (not more then the Marechel Criterion value) under extremely simple design conditions in which the equation (10) is solved using a decentering tolerance of 2.5 μm and a thickness tolerance of 1.0 μm and the range of the third-order thickness sensitivity TSA3 is defined by the equation (13), (14), or (15).

In other words, as is expressed by the equations (13), (14), and (15), the objective lens 8 can be provided with the minimized total value of aberration by adjusting the third-order thickness sensitivity TSA3 to a negative value but not substantially zero, or specifically a value of around −0.009 λrms.

In the design of the objective lens 8, the focal length f, the glass material's refractive index n, and the thickness d of the objective lens 8 may be changed within the respective ranges defined by the equations (16) to (18). In this case, for example, any deviation from the characteristic curve QC3 (FIG. 13) is extremely small, −0.04<Y<0.003. Therefore, the same linearity as that of the equation (6) can be attained.

Likewise, in the design of the objective lens 8, the focal length f, the glass material's refractive index n, and the thickness d of the objective lens 8 may be changed within the respective ranges defined by the equations (16) to (18). In this case, the wavefront aberration level can be adjusted to within the desired range by calculating the wavefront-aberration deterioration level TOR using the equation (10) to define the range of the third-order thickness sensitivity TSA3.

According to the above embodiment, when producing the objective lens 8 to be mounted on the optical pickup 7 of the optical disc apparatus 1, each of the third-order decentering sensitivity DCm3, the fifth-order decentering sensitivity DCm5, and the fifth-order thickness sensitivity TSA5 is converted into the third-order sensitivity TSA3. The objective lens 8 is designed so that the wavefront aberration deterioration level TOR calculated by the equation (10) satisfies the Marechel Criterion value by defining the thickness tolerance and the decentering tolerance and adjusting the third-order thickness sensitivity TSA to within the range defined by the equation (13). Therefore, the wavefront aberration level can be comparatively lowered as long as the decentering error DER and the thickness error TER are within the ranges of the decentering tolerance and the thickness tolerance, respectively, at the time of production. As a result, the objective lens 8 can exert desired optical characteristics.

5. OTHER EMBODIMENTS

The above embodiment has been described with respect to the case where the third-order decentering sensitivity DCm3, the fifth-order decentering sensitivity DCm5, and the fifth-order thickness sensitivity TSA5 in the equation (10) were converted into the third thickness sensitivity TSA3 on the basis of the relations of the equations (6) to (8), respectively, to define the range of the third thickness sensitivity TSA3 as represented by the equation (13).

However, the present invention is not limited to such an embodiment. Alternatively, each of seventh or higher order thickness sensitivity and seventh or higher order decentering sensitivity in the equation (9) may be converted into the third-order thickness sensitivity TSA3 using the coefficients of a linear function listed in Table 4 to define the range of the third-order thickness sensitivity TSA3 as shown in the equation (12). In this case, the accuracy of the wavefront-aberration deterioration level TOR can be more increased than the use of the equation (10). Thus, the range of the third-order sensitivity TSA3 can be also defined with high accuracy.

Furthermore, as shown in the equations (6) to (8), each of the thickness sensitivity levels and each of the decentering sensitivity levels can be replaced with each other in the form of a linear function. Thus, in addition to replace each of the thickness sensitivity levels and the decentering sensitivity levels with the third-order thickness sensitivity TSA3, it may be replaced with any of thickness sensitivity levels or decentering sensitivity levels, such as third-order decentering sensitivity DCm3. The point is to represent the wavefront-aberration determination amount TOP by one sensitivity level and define the range of such sensitivity.

In the above embodiment, it has been described that the collimator lens 14 of the optical pickup 7 is fixed and to calculate the wavefront-aberration deterioration level TOR using the equation (10).

However, the present invention is not limited to such an embodiment. Alternatively, for example, the collimator lens 14 may be shifted in the optical axis direction of the light beam L to adjust the incident scale factor of the optical beam L to be incident on the objective lens 8.

In this case, the third-order spherical aberration can be corrected by adjusting the moving distance of the collimator lens 14. Thus, the wavefront-aberration deterioration level TOR can be calculated using the equation (22) which is prepared by removing the term of the third-order thickness sensitivity TSA3 from the equation (10).

$$TOR = \sqrt{2.5^2(DCm3^2 + DCm5^2) + (TSA5^2)} \quad (22)$$

Figure 26:
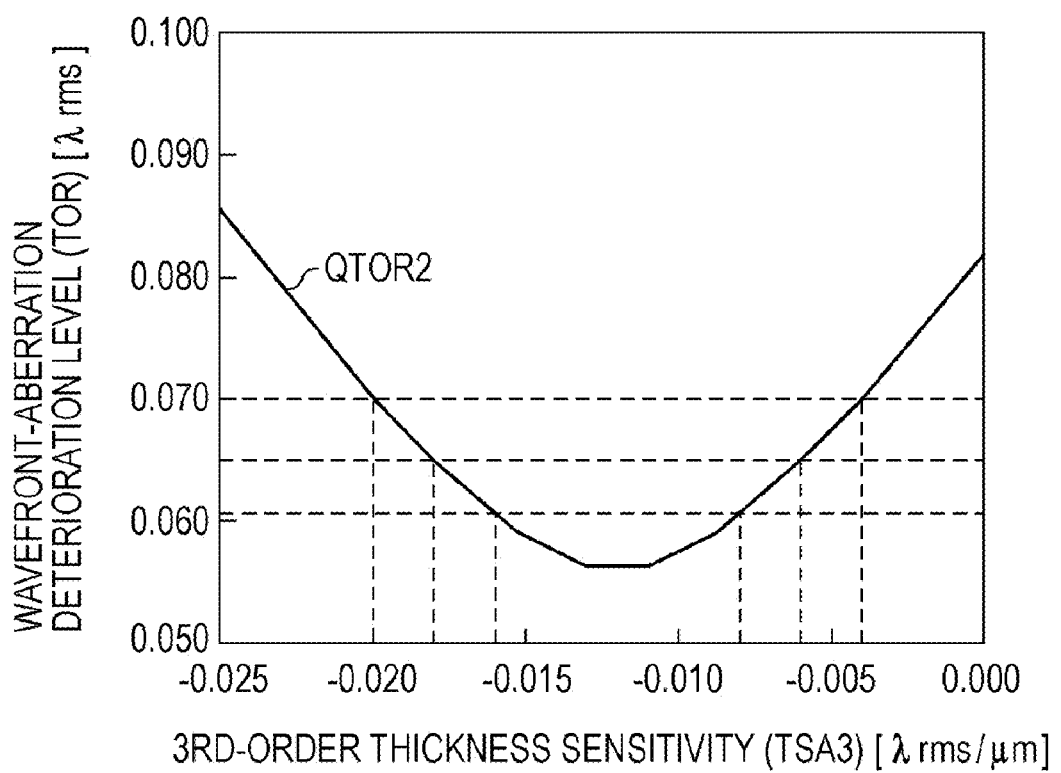
FIG. 26 is a schematic diagram illustrating the relation between third-order thickness sensitivity and a wavefront-aberration deterioration level when moving a collimator lens.

In addition, if each of the equations (6) to (8) is substituted for the equation (22), the wavefront-aberration deterioration level TOR is represented as a function in which only the third-order thickness sensitivity TSA3 serves as a variable. Based on this function, the relation between the third-order thickness sensitivity TSA3 and the wavefront aberration deterioration level TOR is graphically represented as shown in FIG. 26, resulting in the characteristic curve QTOR2 corresponds to the characteristic curve QTOR in FIG. 12.

From the characteristic curve QTOR2, the range represented by the following equation (23) corresponding to the equation (13) servers as a condition of the third-order thickness sensitivity TSA3 that satisfies the Marechel Criterion.

$$-0.020 \leq TSA3 \leq -0.004 \quad (23)$$

In addition, just as in the case with the equations (14) and (15), the condition of the third-order thickness sensitivity TSA3 may be lowered as represented by the following formula (24) or further lowered as represented by the following formula (25) when considering further lowering of the upper limit of the aberration level on the Marechel Criterion.

$$-0.018 \leq TSA3 \leq -0.006 \quad (24)$$

$$-0.016 \leq TSA3 \leq -0.008 \quad (25)$$

The range of the third-order thickness sensitivity TSA3 is narrowed from the range of the equation (23) to the range of the equation (24) and further to the range of the equation (25) to extent both the range of the decentering tolerance and the range of the thickness tolerance, which allow the objective lens 8 to obtain desired optical characteristics. As a result, the occurrence probability of inferior goods can be reduced markedly.

In the above embodiment, the objective lens 8 has a focal length f of 1.41 mm, a glass material's refractive index n of 1.52, a thickness d of 1.80 mm, and a numerical aperture of 0.85. In addition, the optical beam L has a wavelength of 405 nm. The cover layer of the optical disc has a thickness of 0.0875 mm.

However, the present invention is not limited to such an embodiment. Alternatively, the focal length f, the glass material's refractive index n, and the thickness d of the objective lens 8 may be changed within the ranges defined by the equations (14) to (16), respectively. Alternatively, the cover layer of the optical disc may have a thickness in the range of 0.075 to 0.100 mm, the numerical aperture (NA) of the objective lens 8 may be an arbitrary value of about 0.8 or more, and the wavelength λ of the optical beam L may be about 450 nm or less. In this alternative case, the spherical aberration and the coma aberration of each of different orders may be calculated based on the respective values being changed. Then, the wavefront-aberration deterioration level TOR of the equation (10) may be calculated.

In the above embodiment, when designing the third-order thickness sensitivity TSA3 so as to be limited within the range defined by the equation (13), the objective lens 8 is made of a glass material, such as glass or plastic, while the refractive index n of the glass material is within the range of 1.50 to 1.70.

However, the present invention is not limited to such an embodiment, for example, the refractive index n of the glass material may be in the range of 1.50 to 1.60 and the glass material may be made of plastic. In this case, the objective lens 18 can be manufactured using a multi-cavity mold, so that the productivity thereof can e increased.

The above embodiment has been described with respect to the case where the light-side lens surface 8A and disc-side lens surface 8B of the objective lens 8 (FIG. 5) are spherical surfaces. However, the present invention is not limited to such an embodiment. Alternatively, for example, at least one of the lens surfaces 8A and 8B may be provided with a diffraction mechanism.

Furthermore, the above embodiment have been described with respect to the case where the equation (12) is applied to the objective lens 8 manufactured by the objective lens manufacturing apparatus with a decentering tolerance of about 2.5 μm and a thickness tolerance of about 1.0 μm.

However, the present invention is not limited to such an embodiment. Alternatively, the objective lens 8 may be manufactured using an objective lens manufacturing apparatus with arbitrary decentering tolerance and arbitrary thickness tolerance. In this case, what is necessary is just to use a decentering tolerance level and a thickness tolerance level in the equation (12), respectively.

Furthermore, the present invention has been described with respect to the case where information-recording processing or information-reproduction processing is carried out by concentrating the light beam L on the optical disc 100 as an optical information recording medium through the objective lens 8.

However, the present invention is not limited to such an embodiment. Alternatively, to any of optical information recording media of various different configurations may be subjected to information-recording processing or information-reproduction processing by concentrating the light beam through the objective lens 8.

The above embodiment has been described so as to be applied to the optical disc device 1 that records information on the optical disc 100 and reproduces the information from the optical disc 100. However, the present invention is not limited to such an embodiment. For example, any embodiment of the present invention may be applied to any kind of an optical disc reproducing device that reproduces information from the optical disc 100.

The above embodiment has been described so that the optical disc device 1 is provided as one including a laser diode 11 as a light source, the objective lens 8 of the embodiment of the present invention that serves as an objective lens, a drive control unit 3 that serves as a position control unit, a spindle motor 5, and an actuator 15. However, the present invention is not limited to such an embodiment. Alternatively, the optical disc device may include any combination of various kinds of optical sources, objective lenses, and position control units.

The present application contains subject matter related to that disclosed in Japanese Priority Patent Application JP 2009-217552 filed in the Japan Patent Office on Sep. 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An objective lens for an optical pickup, having a numerical aperture of 0.8 or more and focusing a light beam of a wavelength λ of 450 nm or less on an optical information recording medium, wherein
   a wavefront-aberration deterioration level TOR, a cumulative value of aberration deterioration, satisfies the following equation (1):

$$TOR = \sqrt{2.5^2(DCm3^2+DCm5^2)+(TSA3^2+TSA5^2)} \leq 0.07 [\lambda rms] \quad (1)$$

wherein:
   TSA3[λrms/μm] refers to a third-order thickness sensitivity level which is a third-order spherical aberration level generated when a thickness error from a predetermined thickness is +1 μm,
   TSA5 [λrms/μm] refers to a fifth-order thickness sensitivity level which is a fifth-order spherical aberration level generated when the thickness error from the predetermined thickness is +1 μm,
   DCm3 refers to a third-order decentering sensitivity level which is a third-order coma aberration level generated when a decentering error of each of lens surfaces is 1 μm, and
   DCm5 refers to a fifth-order decentering sensitivity level which is a fifth-order coma aberration level generated when a decentering error of each of lens surfaces is 1 μm.

2. The objective lens according to claim 1, wherein said wavefront-aberration deterioration level TOR satisfies the following equation (2):

$$TOR = \sqrt{2.5^2 \cdot \Sigma DCmk^2 + \Sigma TSAk^2} \leq 0.07 [\lambda rms] \quad (2)$$

wherein TSAk [λrms/μm] refers to a k-order thickness sensitivity level, a k-order spherical aberration level, which is caused when said thickness error is +1 μm (where k is an odd number of 3 or more); and
   DCmk [λrms/μm] refers to a k-order decentering sensitivity level, a k-order coma aberration level, which is caused when said decentering error is +1 μm (where k is an odd number of 3 or more).

3. The objective lens according to claim 1, wherein said third-order thickness sensitivity TSA3 satisfies the following equation (3) when a refractive index n of a structural material of said objective lens satisfies 1.5≦n≦1.7, and a focal length f satisfies 0.90≦f≦2.2:

$$-0.014 \leq TSA3 \leq -0.005 \quad (3).$$

4. The objective lens according to claim 3, wherein said third-order thickness sensitivity TSA3 satisfies the following equation (4):

$$-0.012 \leq TSA3 \leq -0.007 \quad (4).$$

5. The objective lens according to claim 3, wherein said structural material is plastic.

6. The objective lens according to claim 3, wherein said refractive index n satisfies 1.5≦n≦1.6 and the Abbe number $v_d$ of said structural material satisfies 50≦$v_d$≦60.

7. The objective lens according to claim 1, wherein said objective lens satisfies a Fraunhofer condition equation represented by the following equation (5):

$$fc = \frac{n^2}{n^2-1}\frac{r_1}{f}, \quad (5)$$
   $$1.05 < fc < 1.25$$

wherein:
   n represents a refractive index,
   f represents a focal distance mm, and
   r1 represents a paraxial radius mm.

8. The objective lens according to claim 1, wherein said light beam is incident on said objective lens through a predetermined collimator lens,
   the movement of said collimator lens changes an incidence magnification of said light beam incident on said objective lens to collect third-order spherical aberration, and
   said third thickness sensitivity TSA3 satisfies the following equation (6):

$$-0.020 \leq TSA3 \leq -0.004 \quad (6).$$

9. An optical pickup, comprising
   a light source that emits a light beam at a wavelength λ of 450 nm or less, and
   an objective lens having a numerical aperture of 0.8 or more and focusing said light beam on an optical information recording medium, wherein
   said objective lens shows a wavefront-aberration deterioration level TOR, a cumulative value of aberration deterioration, satisfying the following equation (7):

$$TOR = \sqrt{2.5^2(DCm3^2+DCm5^2)+(TSA3^2+TSA5^2)} \leq 0.07 [\lambda rms] \quad (7)$$

wherein
   TSA3 [λrms/μm] refers to a third-order thickness sensitivity level, which is a third-order spherical aberration level generated when a thickness error from a predetermined thickness is +1 μm,
   TSA5 [λrms/μm] refers to a fifth-order thickness sensitivity level, which is a fifth-order spherical aberration level generated when a thickness error from a predetermined thickness is +1 μm, DCm3 refers to a third-order decentering sensitivity level, which is a third-order coma aberration level generated when a decentering error of each of lens surfaces is 1 μm, and DCm5 refers to a fifth-order decentering sensitivity level, which is a fifth-order coma aberration level generated when a decentering error of each of lens surfaces is 1 μm.

10. An optical information recording/reproduction apparatus, comprising:
   a light source that emits a light beam at a wavelength λ of 450 nm or less;
   an objective lens having a numerical aperture of 0.8 or more and focusing said light beam on an optical information recording medium; and
   a position control unit that controls the position of said objective lens so that the focus of said objective lens is placed on a desired point on said optical recording medium, wherein
   said objective lens shows a wavefront-aberration deterioration level TOR, a cumulative value of aberration deterioration, satisfying the following equation (8):

$$TOR = \sqrt{2.5^2(DCm3^2 + DCm5^2) + (TSA3^2 + TSA5^2)} \leq 0.007 [\lambda rms] \quad (8)$$

wherein:
   TSA3 [λrms/μm] refers to a third-order thickness sensitivity level, which is a third-order spherical aberration level generated when a thickness error from a predetermined thickness is +1 μm,
   TSA5 [λrms/μm] refers to a fifth-order thickness sensitivity level, which is a fifth-order spherical aberration level generated when a thickness error from a predetermined thickness is +1 μm,
   DCm3 refers to a third-order decentering sensitivity level, which is a third-order coma aberration level generated when a decentering error of each of lens surfaces is 1 μm, and
   DCm5 refers to a fifth-order decentering sensitivity level, which is a fifth-order coma aberration level generated when a decentering error of each of lens surfaces is 1 μm.

* * * * *